United States Patent
Lee

(10) Patent No.: US 9,406,281 B2
(45) Date of Patent: Aug. 2, 2016

(54) MULTI-DISPLAY DEVICE AND METHOD OF CONTROLLING THEREOF

(71) Applicant: Samsung Electronics Co., Ltd, Suwon-si, Gyeonggi-do (KR)

(72) Inventor: Jae-yeol Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 104 days.

(21) Appl. No.: 13/961,107

(22) Filed: Aug. 7, 2013

(65) Prior Publication Data

US 2014/0184628 A1 Jul. 3, 2014

(30) Foreign Application Priority Data

Dec. 27, 2012 (KR) .................. 10-2012-0155190

(51) Int. Cl.
G09G 5/36 (2006.01)
G09G 5/00 (2006.01)
G09G 5/14 (2006.01)
G06F 3/14 (2006.01)
G06F 1/16 (2006.01)
G06F 3/01 (2006.01)
G06F 3/03 (2006.01)
G06F 3/0488 (2013.01)

(52) U.S. Cl.
CPC .............. *G09G 5/14* (2013.01); *G06F 1/1649* (2013.01); *G06F 3/017* (2013.01); *G06F 3/0304* (2013.01); *G06F 3/04883* (2013.01); *G06F 3/1423* (2013.01); *G06F 2200/1614* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,970,173 B2 * | 11/2005 | Ciolac ........................ | 345/544 |
| 7,471,890 B2 | 12/2008 | Lee et al. | |
| 7,561,116 B2 * | 7/2009 | Westerinen et al. ......... | 345/1.1 |
| 8,330,733 B2 | 12/2012 | Petschnigg et al. | |
| 8,704,732 B2 * | 4/2014 | Pourbigharaz et al. ...... | 345/1.1 |
| 8,866,763 B2 * | 10/2014 | Sirpal et al. .................. | 345/173 |
| 8,907,906 B2 * | 12/2014 | Sirpal et al. .................. | 345/173 |
| 2003/0011534 A1 * | 1/2003 | Rengan et al. ............... | 345/1.1 |
| 2009/0254861 A1 | 10/2009 | Seetharamakrishnan et al. | |
| 2009/0322765 A1 * | 12/2009 | Grigor et al. ................. | 345/502 |
| 2010/0079392 A1 | 4/2010 | Chiang et al. | |
| 2010/0175018 A1 | 7/2010 | Petschnigg et al. | |
| 2010/0180254 A1 | 7/2010 | Petschnigg et al. | |
| 2011/0216064 A1 | 9/2011 | Dahl et al. | |
| 2012/0235924 A1 * | 9/2012 | Hochmuth et al. .......... | 345/173 |

FOREIGN PATENT DOCUMENTS

| | | |
|---|---|---|
| KR | 2007-0022612 | 2/2007 |
| KR | 2009-0092641 | 9/2009 |
| KR | 2011-0066165 | 6/2011 |

* cited by examiner

*Primary Examiner* — Jacinta M Crawford
(74) *Attorney, Agent, or Firm* — Staas & Halsey LLP

(57) ABSTRACT

A multi-display apparatus includes a first body mounted with a first display, a second body mounted with a second display, a hinge connecting the first body and the second body, a first frame buffer corresponding to a first display, a second frame buffer corresponding to a second display, and a controller which manages the first and second frame buffers with a separate storing method which separately manages the first and second frame buffers and stores data or a united storing method which manages the first and second frame buffers as one virtual united frame buffer and stores data. The controller stores data on the first and second frame buffers by converting the managing method according to data features displayed on the first and second displays, and the first and second displays display the data stored in the first and second frame buffers respectively.

25 Claims, 42 Drawing Sheets

FIG. 4
(1)
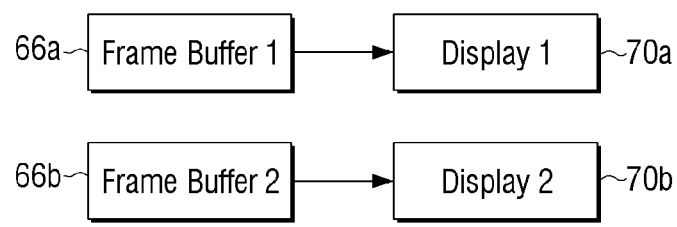
(2)
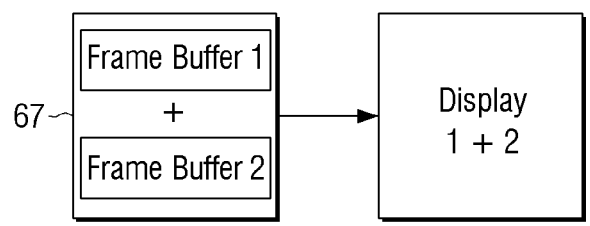

FIG. 7
(1)
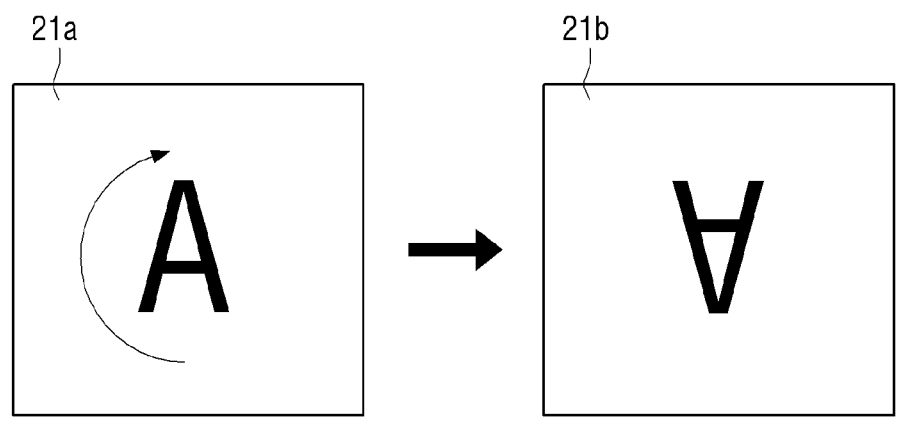
(2)
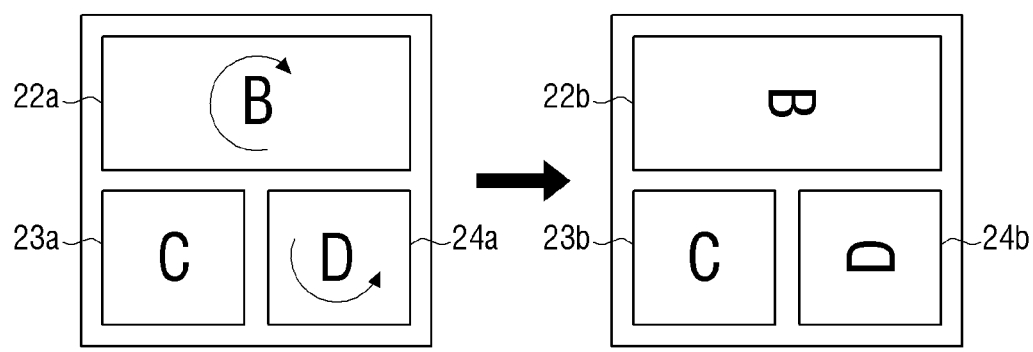

FIG. 13
(1)
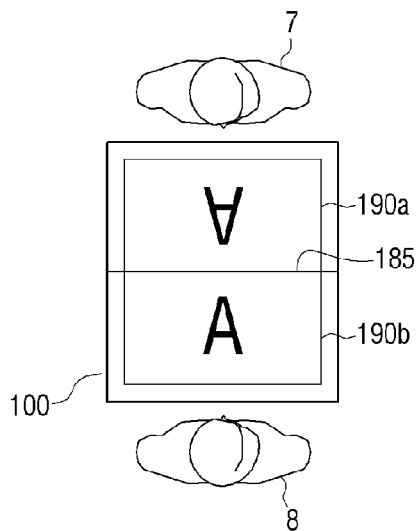
(2)
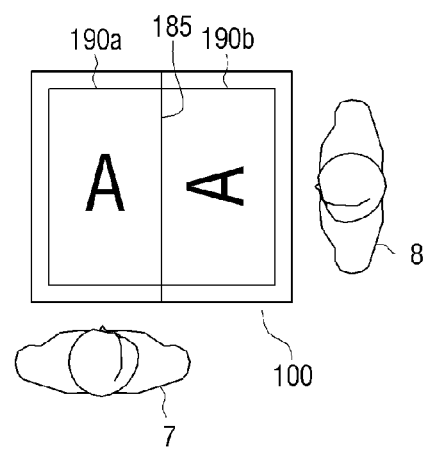
(3)
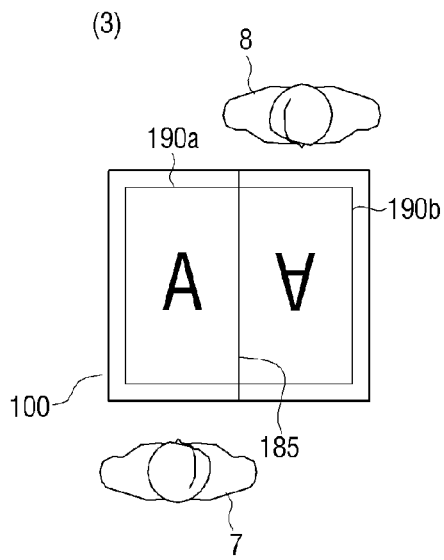
(4)
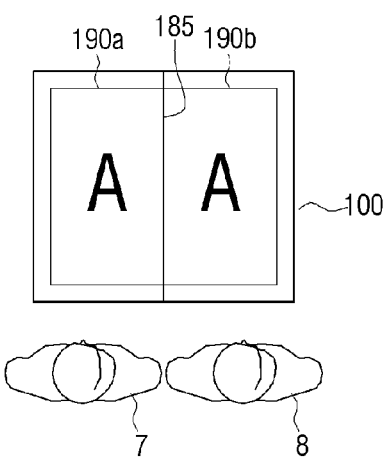

FIG. 27
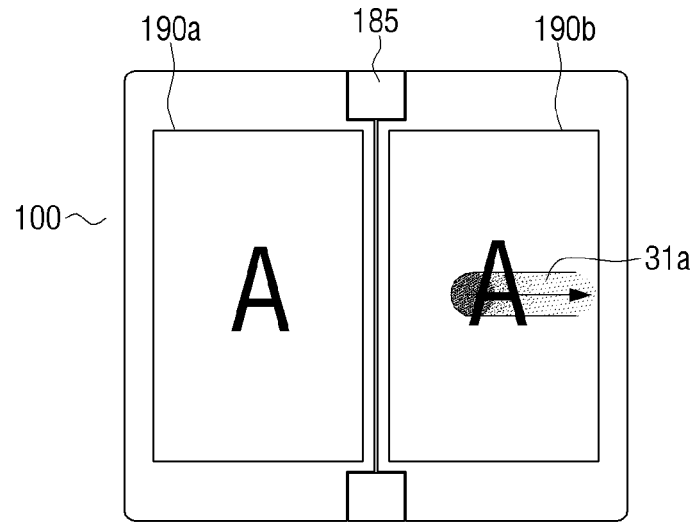
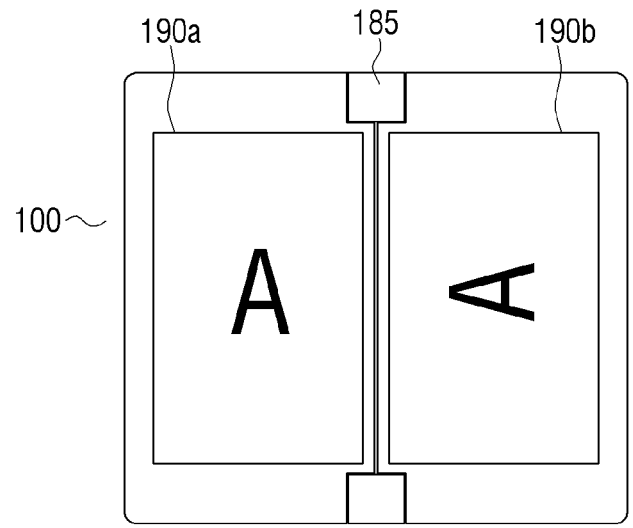

FIG. 30
(1)
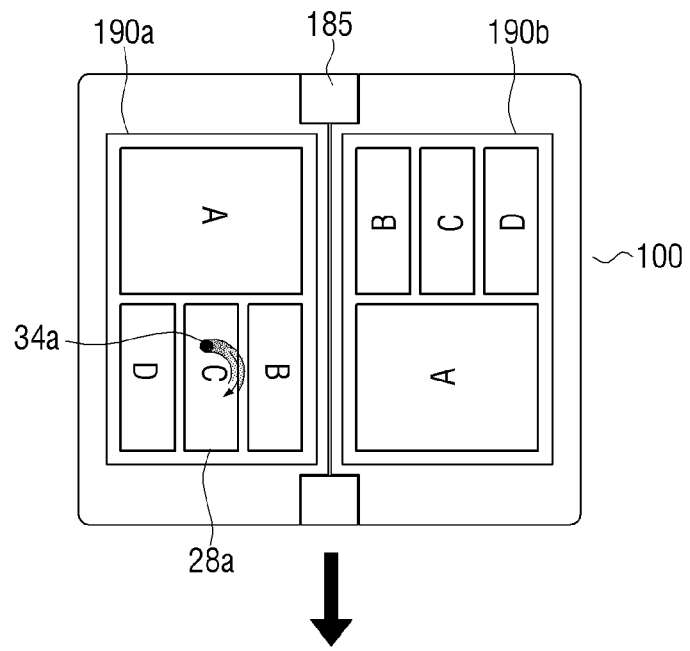
(2)
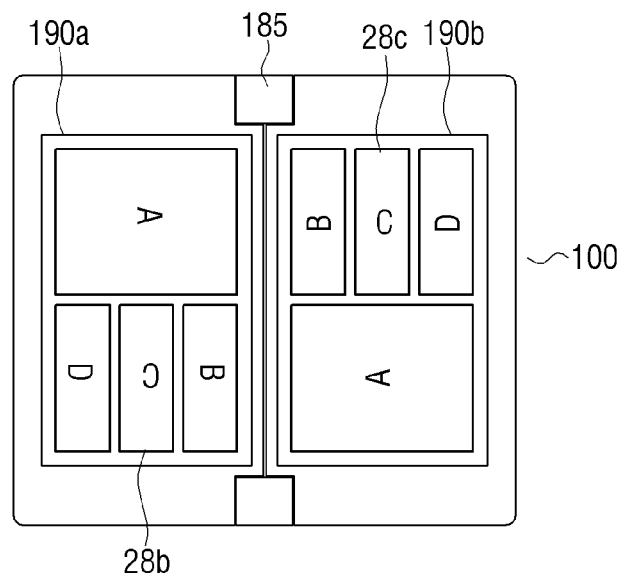

FIG. 33
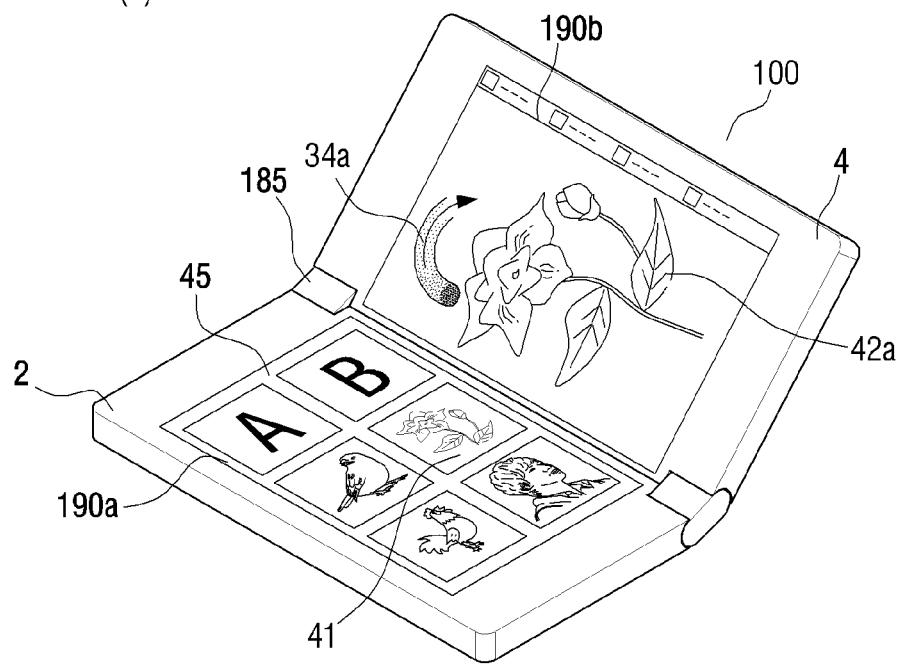
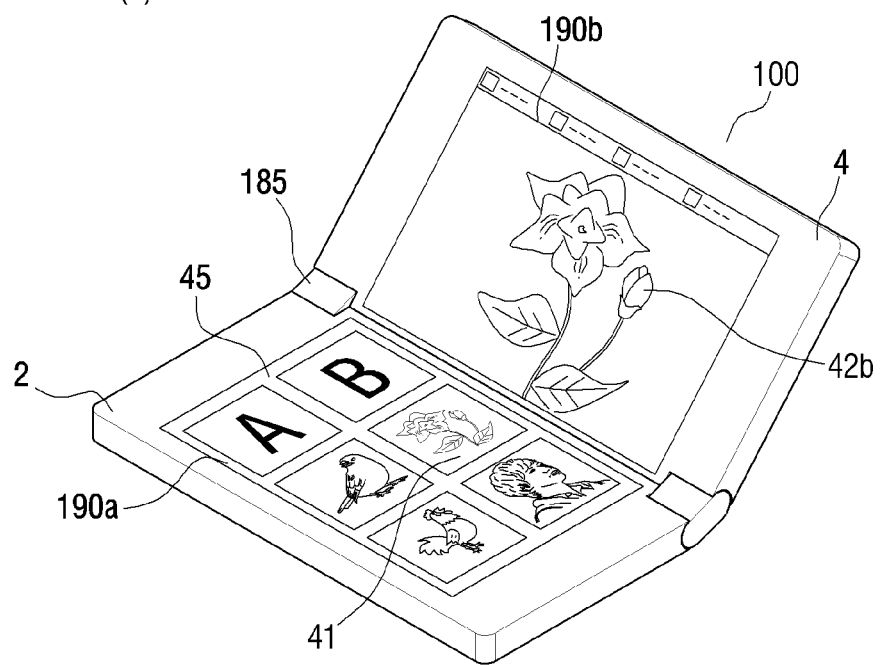

FIG. 35
(1)
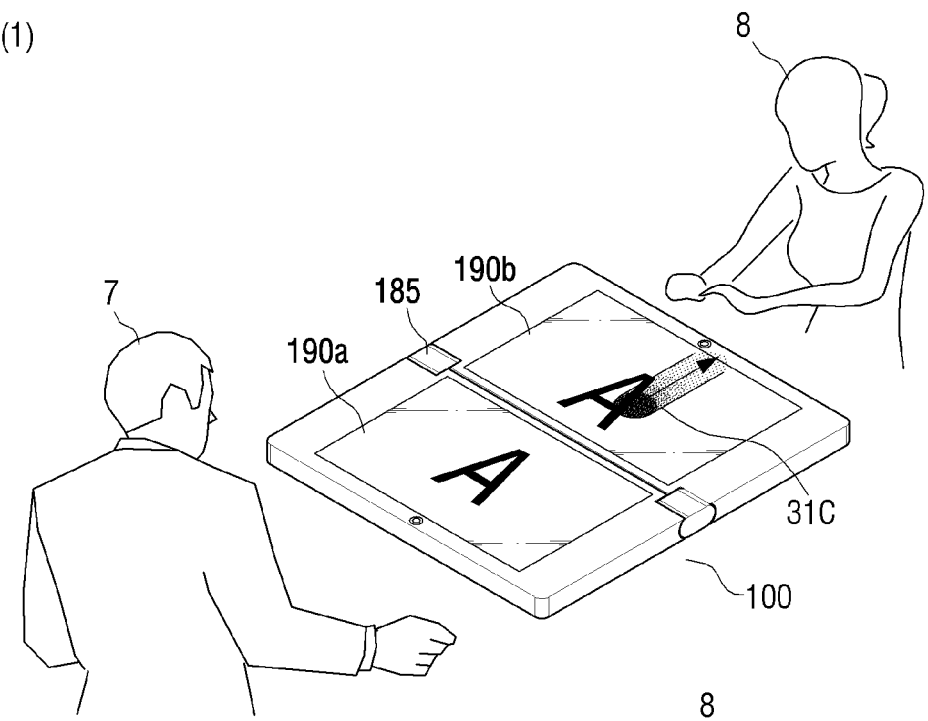
(2)
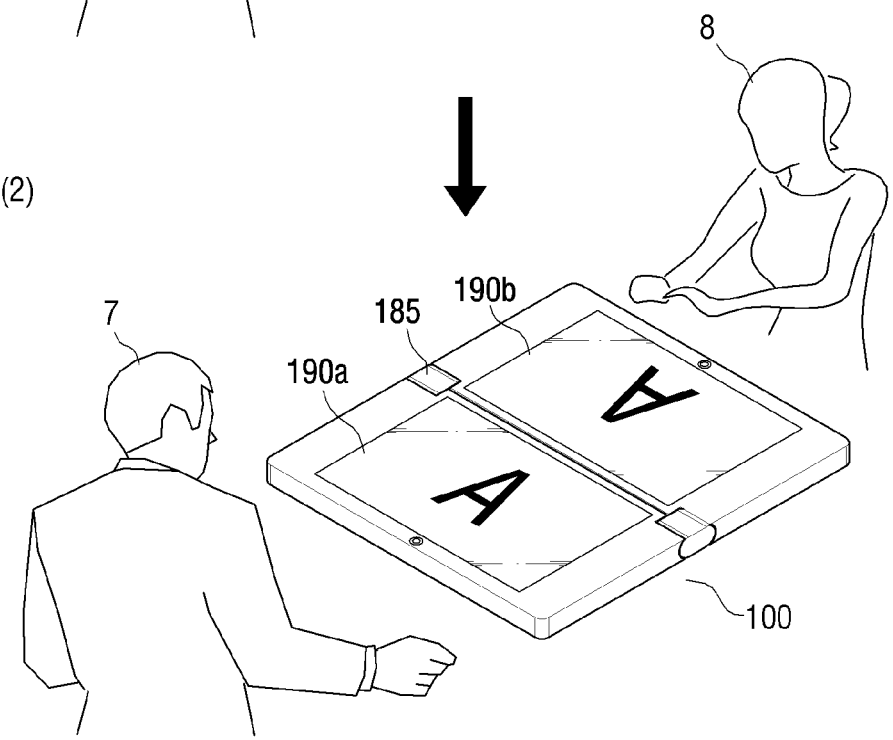

MULTI-DISPLAY DEVICE AND METHOD OF CONTROLLING THEREOF

CROSS-REFERENCE TO RELATED APPLICATIONS

This application claims the benefit of priority under 35 U.S.C. §119 from Korean Patent Application No. 10-2012-0155190, filed on Dec. 27, 2012 in the Korean Intellectual Property Office, the disclosure of which is incorporated herein by reference in its entirety.

BACKGROUND OF THE INVENTION

1. Field of the Invention

Devices and methods consistent with what is disclosed herein relate to a multi-display apparatus and a controlling method thereof, and more specifically, to a multi-display apparatus which controls display screens of a display and a controlling method thereof.

2. Description of the Related Art

Various types of display apparatuses have been used recently. Some display apparatuses may have more than two displays, and the trends are towards bigger sized screens. Therefore, a user can watch a plurality of screens, implementing a plurality of applications in these display apparatuses.

However, conventional dual display apparatuses display a whole screen by partition-outputting screens in which one window is physically divided. Therefore, even when displaying separate application screens on respective displays, a problem arises in that it is not possible to control each screen separately.

Thus, there is need for a technology that can control screens separately in a multi-display apparatus providing multi-tasking environment, so that a user can use with more convenience.

SUMMARY OF THE INVENTION

Exemplary embodiments of the present inventive concept overcome the above disadvantages as well as other disadvantages not described above. Also, the present inventive concept is not required to overcome the disadvantages described above, and an exemplary embodiment of the present inventive concept may not overcome any of the problems described above.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a multi-display apparatus which controls a plurality of screens according to allocating addresses of frame buffers, and a controlling method thereof.

The foregoing and/or other features and utilities of the present general inventive concept may also be achieved by providing a multi-display apparatus which mounts a first body which includes a first display, a second body which includes a second display, a hinge which connects the first body and the second body, a first frame buffer which corresponds to the first display, a second frame buffer which corresponds to the second display, and a controller which manages the first frame buffer and the second frame buffer according to a managing method of either a separate storing method which separately manages the first and second frame buffers and stores data or a united storing method which manages the first and second frame buffers as one virtual united frame buffer and stores data. The controller stores data in the first and second frame buffers by converting the managing method according to data features displayed on the first and second displays. Further, the first and second displays display the data stored in the first and second frame buffers respectively.

The controller may allocate separate addresses on the first and second frame buffers when managing with the separate storing method, divide whole addresses of the virtual united frame buffer into a first group and a second group, and allocate addresses of the first group on the first frame buffer and addresses of the second group on the second frame buffer when in the management with the united storing method, and dynamically allocate the addresses.

The multi-display apparatus may additionally include a rotation recognizing sensor which senses rotation of the multi-display apparatus. The controller may adjust a first screen data to be displayed on the first display and a second screen data to be displayed on the second display respectively according to the rotation, store the adjusted first and second screen data on the first and second frame buffers, and separately convert screens of the first and second displays according to the rotation.

The multi-display apparatus may additionally include a user recognizing sensor which recognizes user position. The controller may adjust a first screen data to be displayed on the first display and a second screen data to be displayed on the second display respectively according to the user position, store the adjusted first and second screen data on the first and second frame buffers, and separately convert screens of the first and second displays according to the recognized user position.

The multi-display apparatus may additionally include a photographer. The controller may adjust a first screen data to be displayed on the first display and a second screen data to be displayed on the second display respectively when user gestures for converting a screen are recognized based on an image captured by the photographer, store the adjusted first and second screen data on the first and second frame buffers, and separately convert screens of the first and second displays according to the user gestures.

The multi-display apparatus may additionally include a touch sensor. The controller may adjust a first screen data to be displayed on the first display and a second screen data to be displayed on the second display respectively when touch gestures for converting a screen are sensed by the touch sensor, store the adjusted first and second screen data on the first and second frame buffers, and separately convert screens of the first and second displays according to the touch gestures.

When data stored in the first frame buffer and data stored in the second frame buffer are the same, and when data stored in the first frame buffer is adjusted, the controller may adjust data stored in the second frame buffer to be uniform with data stored in the first frame buffer and store the adjusted data on the second frame buffer so that screens of the first and second displays can be simultaneously converted.

Screens of the first display and the second display may be home screens or implement screens of selected applications.

The foregoing and/or other features and utilities of the present general inventive concept may also be achieved by providing a controlling method of a multi-display apparatus which includes a first body mounted with a first display, a second body mounted with a second display, and a hinge connecting the first body and the second body including the steps of managing the first and second frame buffers according to a managing method of either a separate storing method which separately manages the first and second frame buffers and stores data or a united storing method which manages the first and second frame buffers as one virtual united frame buffer and stores data, storing data on the first and second frame buffers by converting the managing method according to data features displayed on the first and second displays, and displaying data stored in the first and second frame buffers respectively.

A non-transitory computer-readable medium may contain computer-readable codes as a program to execute the above-mentioned steps.

The managing the first and second frame buffers may further comprise allocating separate addresses on the first and second frame buffers when in the management with the separate storing method, dividing whole addresses of the virtual united frame buffer into a first group and a second group and allocating addresses of the first group on the first frame buffer and addresses of the second group on the second frame buffer when in the management with the united storing method, and dynamically allocating the addresses.

The controlling method of the multi-display apparatus may additionally include sensing rotation of the multi-display apparatus. The storing data on the first and second frame buffers may further comprise separately adjusting at least one of a first screen data to be displayed on the first display and a second screen data to be displayed on the second display in a converting format according to the rotation, and storing the adjusted first and second screen data on the first and second frame buffers.

The controlling method of the multi-display apparatus may additionally include recognizing user position. The storing data on the first and second frame buffers may further comprise separately adjusting at least one of a first screen data to be displayed on the first display and a second screen data to be displayed on the second display so as to be converted according to the user position, and storing the adjusted first and second screen data on the first and second frame buffers.

The controlling method of the multi-display apparatus may additionally include photographing user gestures and recognizing user gestures by using the photographed image. The storing data on the first and second frame buffers may further comprise separately adjusting at least one of a first screen data to be displayed on the first display and a second screen data to be displayed on the second display so as to be converted according to the user gestures, and storing the adjusted first and second screen data on the first and second frame buffers.

The controlling method of the multi-display apparatus may additionally include receiving touch gestures. The storing data on the first and second frame buffers may further comprise separately adjusting at least one of a first screen data to be displayed on the first display and a second screen data to be displayed on the second display so as to be converted according to the touch gestures, and storing the adjusted first and second screen data on the first and second frame buffers.

When data stored in the first frame data and data stored in the second frame data are the same and when data stored in the first frame buffer is adjusted, the storing data may on the first and second frame buffers may further comprise adjusting data stored in the second frame buffer to be uniform with the data stored in the first frame buffer so that screens of the first and second displays can be simultaneously converted, and storing the adjusted data on the second frame buffer.

A screen of the first display and a screen of the second display may be home screens or screens corresponding to areas of selected applications.

The foregoing and/or other features and utilities of the present general inventive concept may also be achieved by providing a multi-display apparatus that manages data with one method of the separate storing method and the united storing method by dynamically allocating addresses of the frame buffers, and can variously control screens displayed on the first and second displays separately or unitedly. Further, when screens displayed on the first and second displays are the same, they may be interoperated and converted by manipulating one display.

The foregoing and/or other features and utilities of the present general inventive concept may also be achieved by providing a multi-display device, comprising a plurality of display screens, a plurality of frame buffers to buffer images to be displayed on the plurality of display screens, each frame buffer being associated with a respective display screen, and a controller to control operation of the plurality of display screens by allocating addresses among the plurality of frame buffers independently when the display screens are individually operated, and allocating addresses among the plurality of frame buffers collectively as a unified virtual buffer when the display screens are cooperatively operated.

The multi-display device may further comprise a rotation sensor to sense a rotational change in the multi-display device, wherein the controller adjusts data stored in the plurality of buffers to affect a change in orientation of information displayed on the plurality of display screens based on signals from the rotation sensor.

The multi-display device may further comprise a near field sensor to sense a user gesture in a space near at least one of the plurality of display screens.

The controller may adjust data stored in the plurality of buffers to affect a change in orientation of information displayed on the plurality of display screens based on signals from the near field sensor.

The controller may execute an application based on signals from the near field sensor.

The controller may execute a preset command based on signals from the near field sensor.

The foregoing and/or other features and utilities of the present general inventive concept may also be achieved by providing a multi-display device, comprising a first body, a second body pivotably connected to the first body, a first and second display mounted on the first and second body, respectively, a first and second frame buffer associated with the first and second display, respectively, to buffer images to be displayed on the first and second display, a sensor to sense a relative angle between the first body and the second body, a controller to control operation of the first and second display screens by allocating addresses among the first and second frame buffers independently when the display screens are individually operated, and allocating addresses among the first and second frame buffers collectively when the display screens are cooperatively operated, wherein the controller adjusts data stored in the plurality of buffers to affect a change in orientation of information displayed on at least one of the first and second display screens based on signals from the sensor.

The first and second display may further comprise a plurality of touch sensors, and the controller may adjust data stored in the plurality of buffers to affect a change in orientation of information displayed on the plurality of display screens based on signals from the plurality of touch sensors.

BRIEF DESCRIPTION OF THE DRAWINGS

The above and/or other aspects of the present inventive concept will be more apparent by describing certain exemplary embodiments of the present general inventive concept with reference to the accompanying drawings, in which:

FIG. 4 is a view illustrating a method of allocating addresses on frame buffers and displaying screen according to an exemplary embodiment of the present general inventive concept;

FIG. 7 is a view illustrating screen converting according to an exemplary embodiment of the present general inventive concept;

FIG. 13 is a view illustrating various exemplary embodiments of screen converting by user recognition;

FIGS. 27 to 29 are views illustrating various exemplary embodiments of screen converting by gestures;

FIG. 30 is a view illustrating that display screens of first and second displays are interoperated and converted;

FIGS. 32 to 33 are views illustrating screen converting in tool kit mode of a multi-display apparatus according to an exemplary embodiment of the present general inventive concept;

FIGS. 34 to 35 are views illustrating screen converting in expanding mode of a multi-display apparatus according to an exemplary embodiment of the present general inventive concept;

DETAILED DESCRIPTION OF THE PREFERRED EMBODIMENTS

Figure 1:
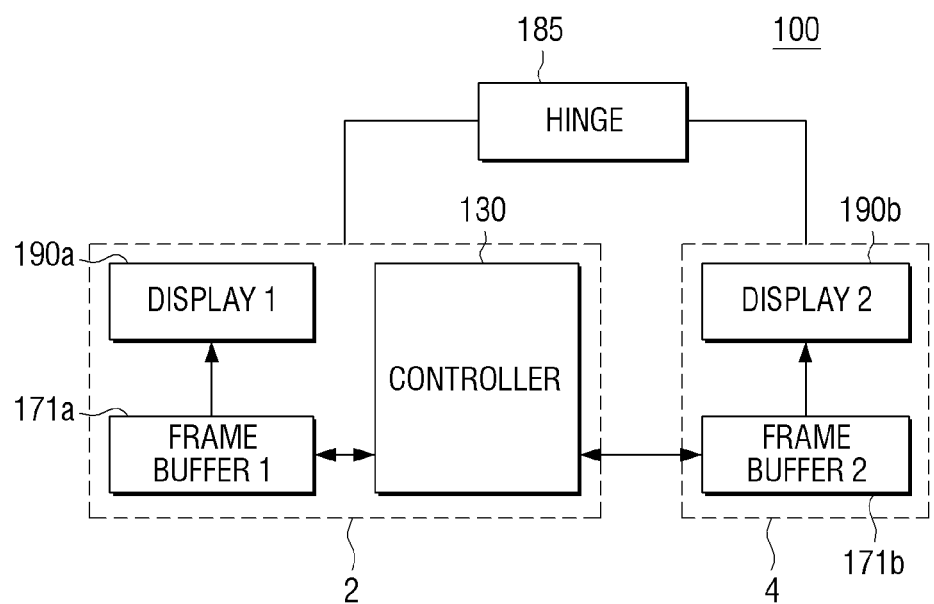
FIG. 1 is a block diagram illustrating a multi-display apparatus according to an exemplary embodiment of the present general inventive concept.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the exemplary embodiments with unnecessary detail.

Referring to the attached drawings, the general inventive concept will be described in detail below. Additionally note that when specific explanations regarding relevant well known technologies or constitutions are considered to affect the essence of the general inventive concept unnecessarily, the explanations will not be included. Terms described below are terms defined by considering functions of the general inventive concept, and may be different according to intentions or customs of users and providers. Therefore, definition of the terms should be determined based on overall explanations of the specification.

In this specification, a multi-display apparatus includes a plurality of displays and is defined as displaying sorts of screens through the displays. Specifically, the multi-display apparatus may be implemented as, for example, any of a tablet personal computer, portable multimedia player (PMP), personal digital assistant (PDA), smart phone, cellular phone, digital frame, and/or game machine.

FIG. 1 illustrates a multi-display apparatus according to an exemplary embodiment.

Referring to FIG. 1, the multi-display apparatus 100 includes a first body 2, a second body 4, and a hinge 185. The first body 2 includes a controller 130, a first frame buffer 171a, and a first display 190a, and the second body 4 includes a second frame buffer 171b and a second display 190b.

The first body 2 and the second body 4 are connected by the hinge 185. The first body 2 and the second body 4 may rotate based on the hinge 185. Accordingly, the first and second displays 190a, 190b may be closed to fold and face each other; or the first and second displays 190a, 190b may be widely opened to face a contrary direction to each other in which back sides of the first and second displays 190a, 190b fold and face each other; or the first and second displays 190a, 190b may be open to any position there between. Further, according to constitutions of the hinge 185, they may be opened straight by 180°. Opening the first body 2 and the second body 4 based on the hinge 185 will be specifically explained in various embodiments described above.

The first frame buffer 171a performs buffering for the image frame displayed on the first display 190a, and the second frame buffer 171b performs buffering for the image frame displayed on the second display 190b.

For example, an image frame processed in digital signals by a graphics processing unit (GPU) (see FIG. 39) is stored in a bitmap format in the first and second frame buffers 171a, 171b. In this case, a buffering area in each of the frame buffers 171a, 171b is allocated to be suitable for a maximum pixel size that each of the displays 190a, 190b can support. The first display driver analyzes the image frame stored in the first frame buffer 171a and converts the information to first image source signals. The first display driver provides the first image source signals to the first display 190a and operates the first display 190a to display the image frame.

Likewise, the second display driver analyzes and converts an image frame stored in the second frame buffer 171b to second image source signals, and provides the second image source signals on the second display 190b to display the image frame.

The first and second frame buffers 171a, 171b may be positioned on a predetermined area within the GPU, or may be positioned by allocating a predetermined area of a storage (not illustrated) in the multi-display apparatus 100. Thus, all of the first and second frame buffers 171a, 171b may be included in the first body 2 or the second body 4. The multi-display apparatus 100 may establish a virtual united frame buffer (not illustrated). The established virtual united frame buffer manages data to be displayed on the first and second displays 190a, 190b as one data.

The controller 130 divides whole addresses of the united frame buffer into a first group and a second group. Addresses of the first group are allocated on the first frame buffer 171a and addresses of the second group are allocated on the second frame buffer 171b. Screens of the first and second displays 190a, 190b may be converted by using addresses allocated to the first and second frame buffers 171a and 171b, and adjusting data stored in the first and second frame buffers 171a and 171b. The controller 130 may be included in the second body 4, or may be arranged in a plurality of units and included in both of the first and second bodies 2, 4.

Figure 39:
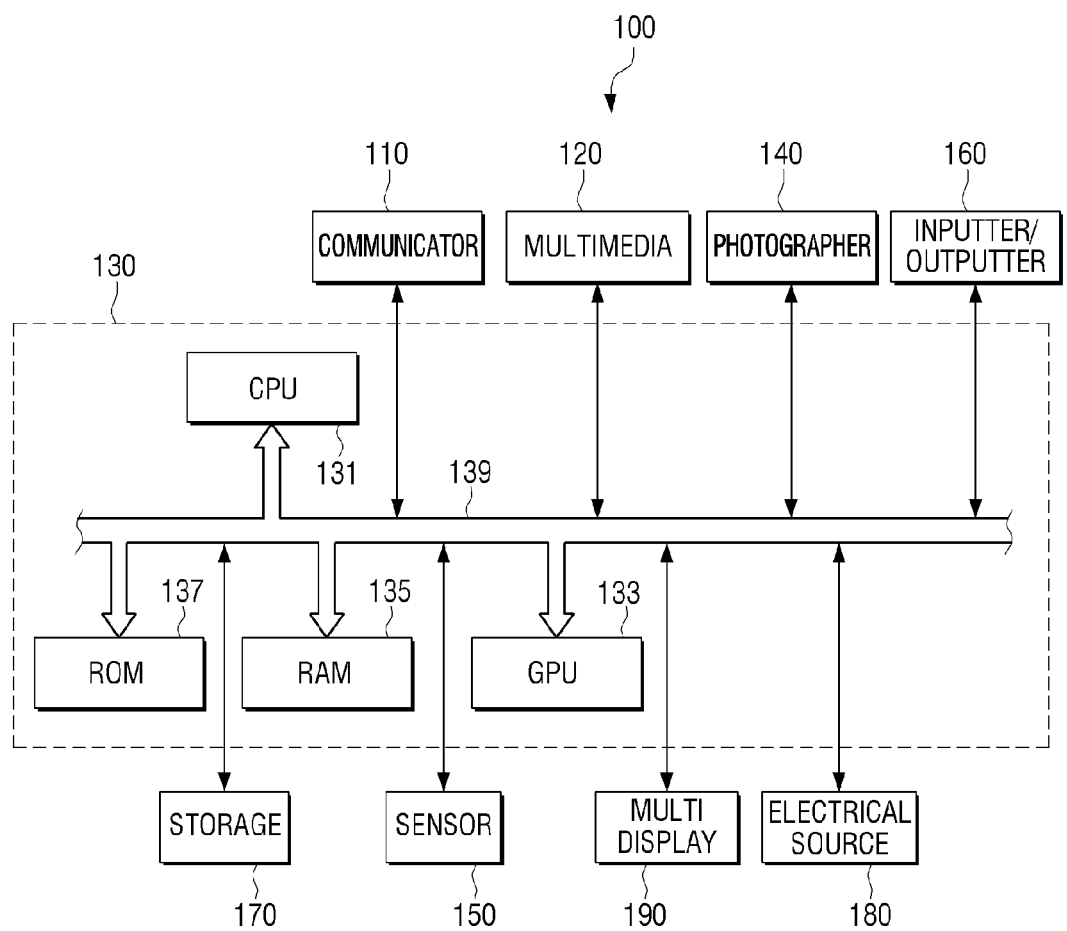
FIG. 39 is a block view illustrating detailed constitution of a multi-display apparatus according to various exemplary embodiments.

The controller 130 may optionally include a GPU (see FIG. 39). When the multi-display apparatus 100 is constituted with the controller 130 including a GPU as one unit, there is an advantage in efficiency of transmitting data. In this case, because the first and second frame buffers 171a, 171b may be positioned within the GPU, the first and second frame buffers 171a, 171b may be positioned and mounted within the controller 130. The united frame buffer (not illustrated) may be implemented with a method of allocating addresses on the first and second frame buffers 171a, 171b; or may be implemented separately by using another storing space. Further, when the united frame buffer is implemented by using another storing space, it may be positioned on the same place of the first frame buffer 171a or the second frame buffer 171b.

Since FIG. 1 illustrates an apparatus constitution including two display units, such as the first and second displays 190a, 190b, it may be referred to as a dual display apparatus. However, the number of display units may be three or more units as well as two units. Thus, the specification refers to the apparatus as a multi-display apparatus.

Figure 2:
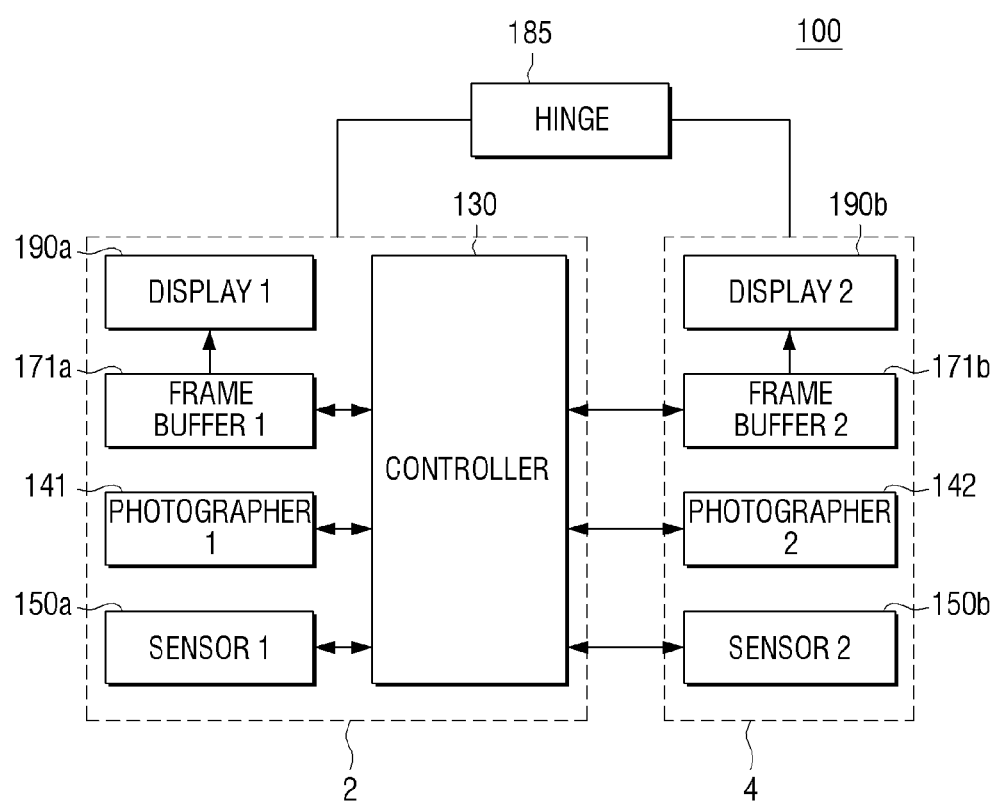
FIG. 2 is a block diagram illustrating a multi-display apparatus according to another exemplary embodiment of the present general inventive concept.

FIG. 2 illustrates a multi-display apparatus 100 according to an exemplary embodiment.

Referring to FIG. 2, the first body 2 may include a first photographer 141 and a first sensor 150a, and the second body 4 may include a second photographer 142 and a second sensor 150b. The multi-display apparatus 100 may include photographers 141, 142 and/or sensors 150a, 150b.

The first and second photographers 141, 142 may photograph or digitally capture an image of a user to facilitate a screen orientation conversion process. The controller 130 recognizes a user's position by analyzing a user image photographed by the first and second photographers 141, 142. The controller 130 adjusts first and second screen data of the first and second frame buffers 171a, 171b according to the recognized user position, and stores each of the adjusted screen data in the first and second buffers 171a, 171b. Thus, screen orientations of the first and second displays 190a, 190b may be converted by the recognized user position. In this case, because the first and second photographers 141, 142 are used to recognize user position, they may be considered as one type of user recognizing sensors.

Further, the first and second photographers 141, 142 may be used to track user space gestures in order to convert screen orientations. Space gestures may also be used to operate the multi-display apparatus 100 by using specific movements of a user (e.g., user hands) on space without physically contacting a touch screen or pushing a button of the multi-display apparatus 100.

The controller 130 may recognize user gestures by analyzing images regarding movements of a user photographed using the first and second photographers 141, 142. When the recognized gestures correspond to a preset command, for example, to convert screen orientation, the controller 130 executes the command. In this case, the controller 130 adjusts first and second screen data of the first and second frame buffers 171a, 171b to change screen orientation and stores each adjusted screen data in the first and second frame buffers 171a, 171b. Thus, screen orientations of the first and second displays 190a, 190b may be converted by the recognized user gestures.

The first and second sensors 150a, 150b may each include a respective rotation recognizing sensor or user recognizing sensor. The rotation recognizing sensor senses rotation of the multi-display apparatus 100 and the user recognizing sensor recognizes user position.

If the first and second sensors 150a, 150b sense a rotation of the multi-display apparatus 100, the controller 130 adjusts first and second screen data of the first and second frame buffers 171a, 171b to change the display orientation according to the rotation of the controller 130 and stores each adjusted screen data in the first and second frame buffers 171a, 171b. Thus, screen orientations of the first and second displays 190a, 190b may be converted by rotation of the multi-display apparatus 100.

Screen orientations may thus be converted according to the above methods using the first and second sensors 150a, 150b when a user position is recognized.

A rotation recognizing sensor to sense rotation of the multi-display apparatus 100 may be, for example, a geomagnetic sensor, an acceleration sensor, a gravity sensor, or a gyro sensor. A user recognizing sensor to recognize user position may be, for example, an infrared light sensor or an ultrasonic wave sensor. One type of sensor may be used to sense rotation or user position, or a combination of different types of sensors may be used.

According to another exemplary embodiment, a user can convert screen orientation by touching a touch screen or by inputting gestures corresponding to a screen converting command into the multi-display apparatus 100 with a near field sensor.

The multi-display apparatus 100 may furthermore convert screen orientation displayed on a first display 190a or a second display 190b by using sensed external information.

The following will describe software layer structure of the multi-display apparatus 100 and a specific method of displaying a screen on the first or second display 190a, 190b.

Figure 3:
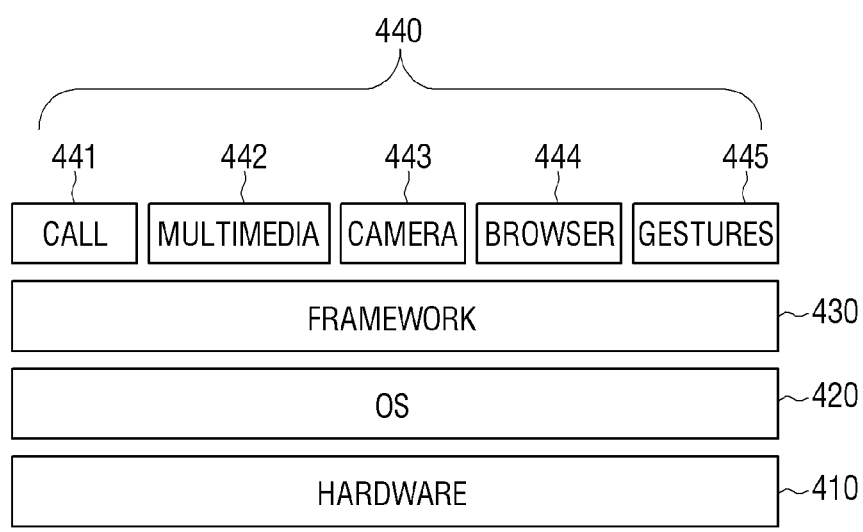
FIG. 3 is a view illustrating system layer structure of a multi-display apparatus according to an exemplary embodiment of the present general inventive concept.

FIG. 3 illustrates a system layer structure of the multi-display apparatus 100 according to an exemplary embodiment. The multi-display apparatus 100 may include various software such as operation system (OS) 420, framework layer 430, call application 441, multimedia application 442, camera application 443, browser 444 and gesture recognizing application 445 as well as hardware 410.

The hardware 410 may include various units such as the controller 130, the photographers 141, 142, and the sensors 150a, 150b of the multi-display apparatus 100.

OS 420 controls general implementation of the hardware 410 and manages the hardware 410. In other words, the OS 420 performs basic functions such as hardware managing, memory and security. OS 420 controls implementation of the multi-display apparatus 100 by operating modules such as, for example, a display driver which operates a multi-display, communicating driver which transmits/receives data, camera driver which operates a photographer, and audio driver which operates an audio and power manager.

The framework layer 430 is installed on top of the OS 420. The framework layer 430 connects an application layer 440 with the OS 420. In other words, the framework layer 430 may include, for example, a location manager, notification manager, and a frame buffer which displays images on a display.

The application layer 440 is installed on top of the framework layer 430. Various application programs, such as, for example, the call application 441, the multimedia application 442, the camera application 443, the browser application 444 and the gesture recognizing application 445 may be included in the application layer 440.

Based on the software layer structure, a method of displaying screens of the multi-display apparatus 100 will be explained below.

FIG. 4 illustrates a method of displaying a screen by allocating addresses on frame buffers according to an exemplary embodiment.

Referring to FIG. 4(1), a first frame buffer 66a and a second frame buffer 66b are mounted physically. The first frame buffer 66a and the second frame buffer 66b are allocated with separate addresses, respectively. In other words, the multi-display apparatus 100 may manage screen display data with a separate storing method which manages the first and second frame buffers 66a, 66b separately. Therefore, data stored in the first frame buffer 66a is displayed on a first display 70a and data stored in the second frame buffer 66b is displayed on a second display 70b.

For example, assume that a user implements a first application on the first display 70a and a second application on the second display 70b. The first and second applications can be marked separately. The controller 130 allocates separate addresses on the first frame buffer 66a and the second frame buffer 66b. If, for example, 0~99 addresses are available on each of the first and second frame buffers 66a, 66b, the controller 130 allocates 0~99 on the first frame buffer 66a and 0~99 on the second frame buffer 66b. The first and second frame buffers 66a, 66b utilize separate addresses and are recognized as separate frame buffers from each other. The controller 130 stores first application screen data in the first frame buffer 66a and second application screen data in the second frame buffer 66b. The stored first application screen data is displayed on the first display 70a, and the stored second application screen data is displayed on the second display 70b. Therefore, when separate addresses are allocated on the first and second frame buffers 66a, 66b, screens displayed on the first and second displays 70a, 70b may be controlled separately.

Referring to FIG. 4(2), the first and second frame buffers 66a, 66b are managed as one virtual united frame buffer 67. The controller 130 divides whole addresses of the virtual united frame buffer 67 into a first group and a second group. Addresses of the first group are allocated on the first frame buffer 66a and addresses of the second group are allocated on the second frame buffer 66b. Thus, the display apparatus 100 may manage screen display data with a united storing method which manages the first and second frame buffers 66a, 66b as one united frame buffer 67. Accordingly, the united frame buffer may be mounted in another storing space.

For example, assume that a user implements one application on the combined, whole area of the first and second displays 70a, 70b. The controller 130 allocates addresses by managing the first and second frame buffers 66a, 66b as one virtual united frame buffer 67. If, for example, addresses of 0~99 are available on the first and second frame buffers 66a, 66b respectively, the controller 130 establishes the addresses of the virtual united frame buffer 67 as 0~199. Thus, a single application screen data is stored in the first and second frame buffers 66a, 66b by allocating addresses of 0~99 on the first frame buffer 66a and addresses of 100~199 on the second frame buffer 66b. Therefore, one application screen data may be displayed on the combined, whole area of the first and second displays 70a, 70b.

The allocation of addresses, either separately or unitedly, may be performed dynamically by the controller 130. Dynamic performance indicates allocating proper addresses according to the situation displayed on the display rather than determining an address allocation method according to a specific application.

Thus, while addresses are separately allocated, when a user expands an application displayed on the first display to display on both the first and second displays, the controller 130 dynamically allocates addresses by converting an address allocating method from the separate address allocating to the united address allocating method. Addresses can be allocated by converting an address allocating method from united to separate as well.

Figure 5:
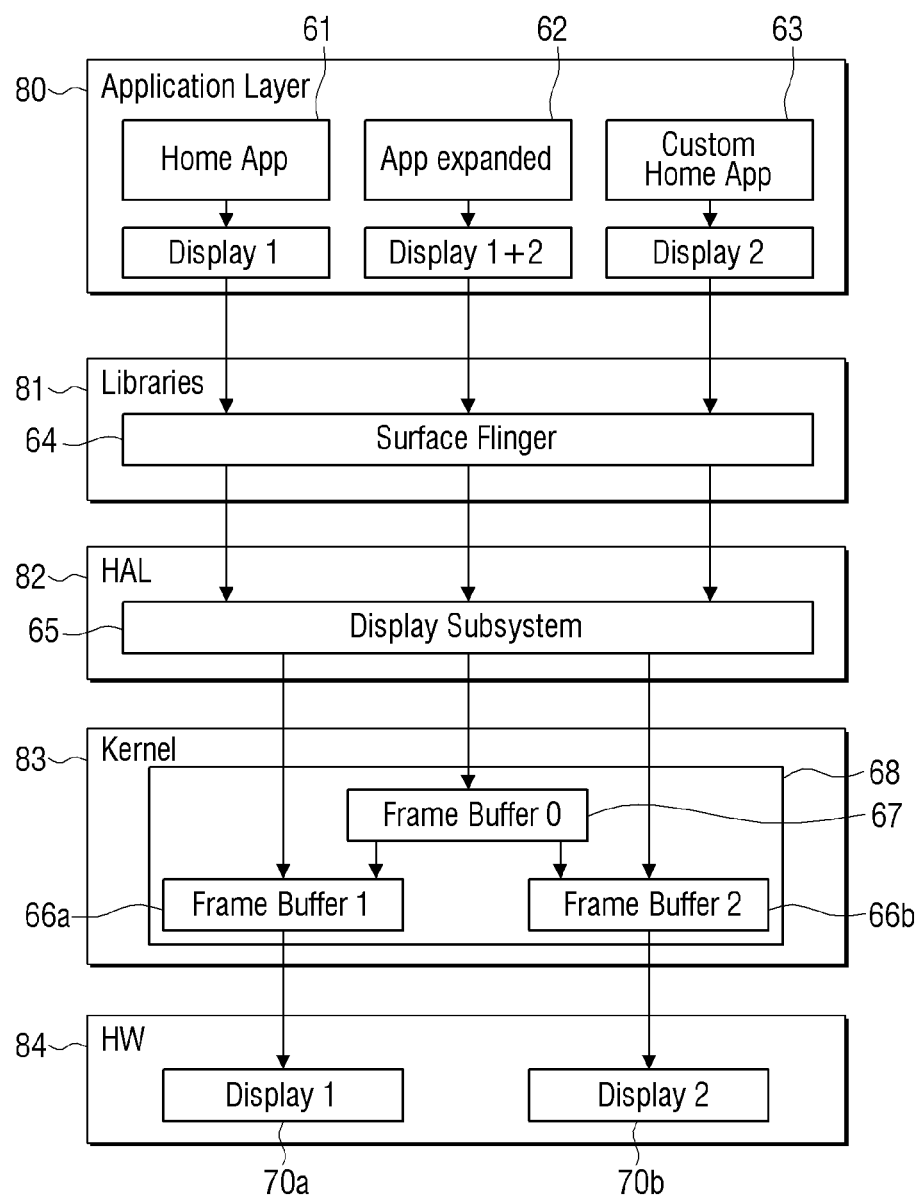
FIG. 5 illustrates a screen displaying method according to an exemplary embodiment of the present general inventive concept.

FIG. 5 illustrates a screen displaying method according to an exemplary embodiment.

Referring to FIG. 5, application layer 80 is a layer in which applied programs called applications are installed. For example, home application 61 or customer home application 63 may be installed. Regarding home application 61, the multi-display apparatus 100 may display the application on the first display 70a. Regarding extended application 62, the multi-display apparatus 100 may display the application on the first and second displays 70a, 70b. Regarding custom home application 63, the multi-display apparatus 100 may display the application on the second display 70*b*.

Libraries layer 81 is a layer which third parties access. In the libraries layer 81, a surface flinger 64 may be installed. The surface flinger 64 plays a role for managing access regarding a display subsystem and controlling 2D and 3D graphic layers of applications. For example, an application may allow a picture to be drawn on a screen surface similar to a canvas through a graphic device interface (GDI) thread. The surface flinger 64 transmits the input received via the surface to display subsystem 65.

The hardware abstraction layer (HAL) 82 comprises the OS and application programming interface (API). The kernel 83 may have additional, different API or operation according to specific device designs. Thus, the HAL 82 inserted between the kernel 83 and applications ensure that applications are uniformly used even when hardware changes. The display subsystem 65 is mounted in the HAL 82. Further, a frame buffer 68 which stores data displayed on the first and second displays 70*a*, 70*b* is installed in the kernel 83. The frame buffer 68 includes the first and second frame buffers 66*a*, 66*b*. A null frame buffer 67 indicates a virtual united frame buffer which unites and manages the first and second frame buffers 66*a*, 66*b*. The drawing only illustrates that the null frame buffer 67 is separately mounted; however, the first and second frame buffers 66*a*, 66*b* may be used with a method of allocating addresses. In this case, a whole unit of the first and second frame buffers 66*a*, 66*b* is one virtual united frame buffer.

As described by referring to FIG. 4, the controller 130 may separately control display units 70*a*, 70*b* through allocating addresses separately on the first and second frame buffers 66*a*, 66*b*. The first and second frame buffers 66*a*, 66*b* may alternatively be managed as the virtual united frame buffer 67 through unitedly allocating addresses, and both display units 70*a*, 70*b* may be managed as one display.

Figure 6:
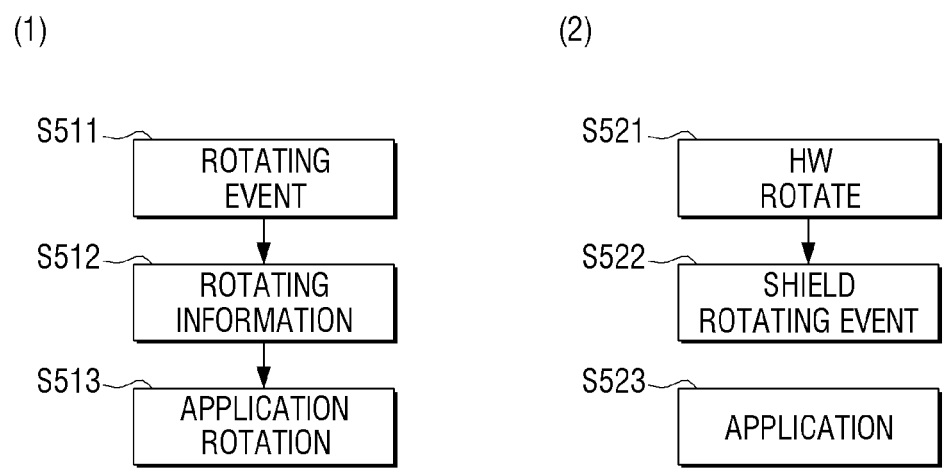
FIG. 6 is a flowchart illustrating a screen converting method according to an exemplary embodiment of the present general inventive concept.

FIG. 6 is a flowchart illustrating a screen orientation converting method according to an exemplary embodiment.

FIG. 6(1) illustrates a method of converting screen orientation of the display by sensed external information. When specific external information is sensed, a rotating event occurs at operation S511. As described above, external information may include gestures corresponding to a screen converting command, sensed user position, or rotation of the multi-display apparatus 100. Thus, a rotating event may be triggered by changes in hardware, such as rotation of the multi-display apparatus 100. Further, when a user's inputting gestures correspond to a screen orientation converting command, the controller 130 may recognize a screen converting command and trigger a rotating event by using software.

If a rotating event occurs, the controller 130 examines rotating information regarding which direction and how much angle a screen displayed on the display should rotate. Screen data is adjusted by using the examined rotating information at operation S512. For example, as one exemplary embodiment of a method of adjusting screen data, a start coordinate is converted only while fixing addresses. Referring to FIGS. 2 and 6(1), adjusted screen data is stored in the first frame buffer 171*a* or the second frame buffer 171*b* by using addresses.

Data stored in the first frame buffer 171*a* is outputted to the first display 190*a* and data stored in the second frame buffer 171*b* is outputted to the second display 190*b*. Because the data stored in the first frame buffer 171*a* or the second frame buffer 171*b* is adjusted by the controller 130 with the examined rotating information, the screen displayed on the first display 190*a* or the second display 190*b* becomes a rotated screen at operation S513. When a rotating event occurs regarding a home screen, the rotated home screen is displayed on the display. When a rotating event occurs regarding a selected application, the rotated application is displayed on the display.

FIG. 6(2) is a flowchart illustrating a method in which screen orientation of the display is not converted when the external information is examined after a rotating event.

Referring to FIG. 6(2), a rotating event occurs by rotation of a hardware device at operation S521. The controller 130 shields the rotating event at operation S522. Thus, even when a hardware device rotates, the data stored in the first and second frame buffers 171*a*, 171*b* are maintained unchanged. Thus, the screen displayed on the display is kept at operation S523.

If a rotating event occurs by using software, the screen displayed on the display may likewise be kept in place with the above method. However, when a shielded rotating event occurs in terms of software, it is more convenient for the related input itself to be disregarded so that a rotating event is not triggered.

If rotating event occurs as described in FIG. 6, the screen orientation displayed on the display may be converted or kept. Therefore, the whole screen orientation displayed on the first display 190*a* or the second display 190*b* can be converted or kept. Further, it can be converted or kept on an application-by-application basis among a plurality of applications displayed on the screen.

FIG. 7 illustrates a screen orientation conversion according to exemplary embodiments.

FIG. 7(1) illustrates an embodiment of converting a whole screen. As illustrated in FIG. 7(1), initial screen 21*a* displays 'A'. A user inputs a command to convert the screen clockwise. Responding to the inputted user command, the screen displayed on the display rotates clockwise and the converted screen 21*b* which rotates by 180° is displayed.

FIG. 7(1) describes an embodiment in which a user command to rotate is inputted as one example. However, screen converting does not limitedly operate by a user command to rotate. Screen converting may be also performed, for example, by sensing rotation and recognizing user position.

FIG. 7(2) illustrates an embodiment in which applications are individually selected and converted among a plurality of applications displayed on screen. In FIG. 7(2), applications of B (22*a*), C (23*a*), and D (24*a*) are displayed on initial screen. A user inputs a command to rotate application B 22*a* by 90° clockwise and application D 24*a* by 90° counterclockwise. Responding to the inputted user command, the screen displayed on the display is converted. Thus, application B 22*b* rotates by 90° clockwise and is displayed. Application D 24*b* rotates by 90° counterclockwise and is displayed. Application C 23*b* is kept because a command to rotate was not inputted.

FIG. 7(2) does not mean that each application rotates limitedly by the inputted user command to rotate. Rotation may also be performed, for example, by sensing rotation of the multi-display apparatus 100 or by recognizing user position. However, when each application rotates due to sensing rotation of the multi-display apparatus 100 or recognizing user position, they may rotate in the same direction. Further, rotation of specific applications can be prevented by disabling rotation regarding specific applications.

Various Embodiments of a Method of Converting a Screen

Figure 8:
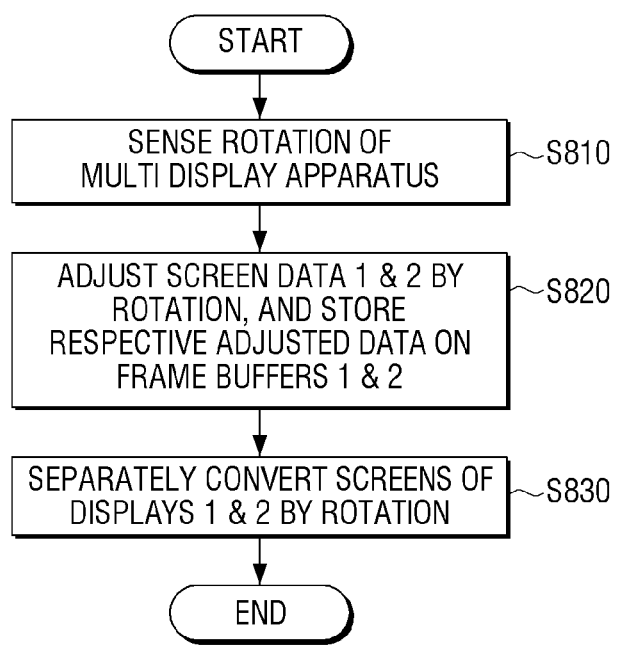
FIGS. 8 and 9 are views illustrating screen converting by sensing rotation of a multi-display apparatus according to an exemplary embodiment of the present general inventive concept.
Figure 9:
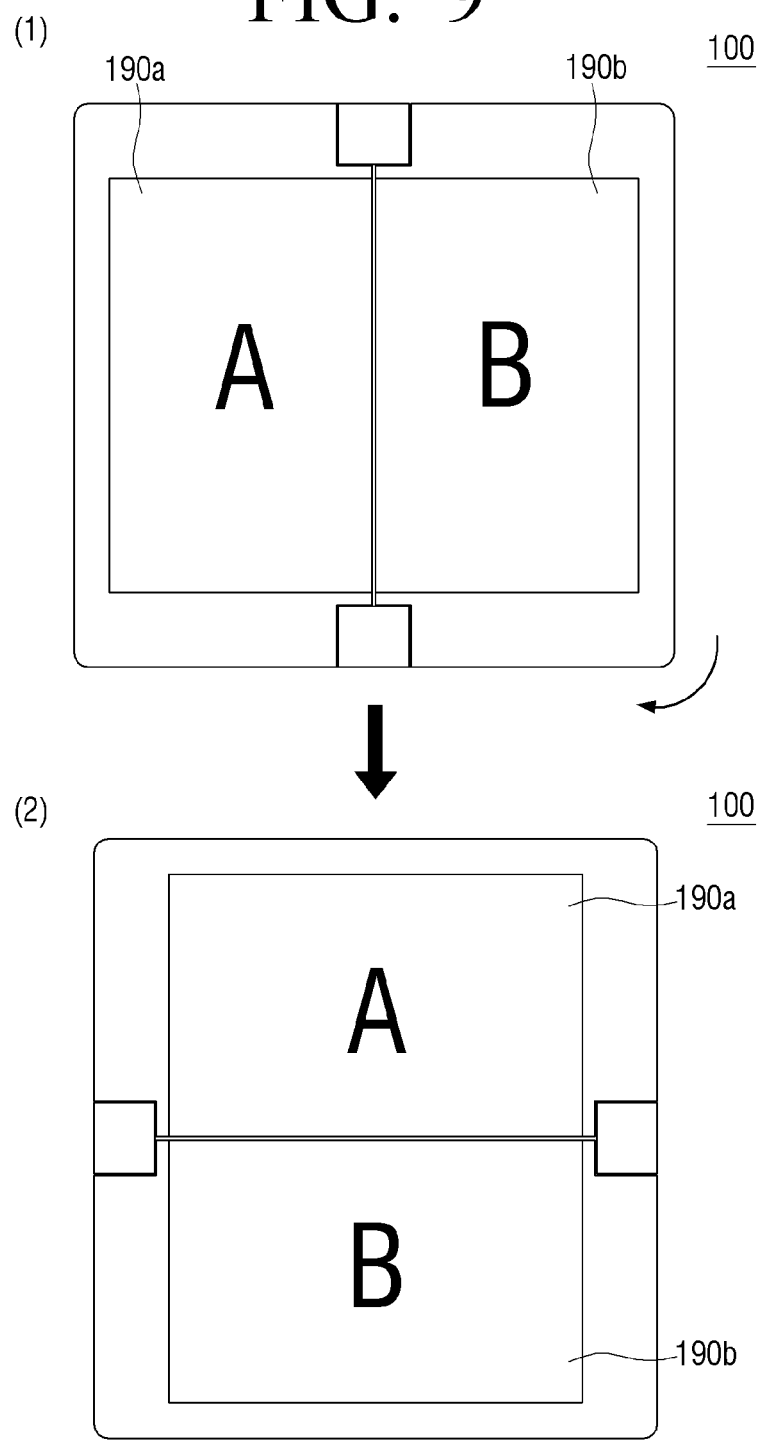

FIGS. 8 to 9 illustrate screen orientation conversion by sensing rotation of the multi-display apparatus 100 according to an exemplary embodiment.

FIG. 8 is a flowchart to illustrate a screen conversion method by sensing rotation of the multi-display apparatus 100. Referring to FIGS. 8 and 2, sensors 150a, 150b may include a rotation recognizing sensor that can sense rotation. Rotation sensed by the sensors 150a, 150b generates a rotating event at operation S810.

The controller 130 adjusts first screen data and second screen data according to the rotation of the multi-display apparatus 100, and stores the adjusted screen data on the first frame buffer 171a and the second frame buffer 171b respectively at operation S820. Rotation of the multi-display apparatus 100 may include rotation of the entire multi-display apparatus 100 or changes of angle made by the first body 2 with respect to the second body 4. For example, in a standing mode in which the first body 2 and the second body 4 are almost folded outside to face almost opposite directions, the first and second screen data may be adjusted so that edge areas of the first body 2 and the second body 4 that are not near the hinge 185 can be directed to the lower area of the screen.

The controller 130 separately converts screens of the first and second displays 190a, 190b according to the rotation of the multi-display apparatus 100 at operation S830. For example, in the standing mode, the screen of the first display 190a displays so that an edge area of the first body 2 that is not near to the hinge can be directed to the lower area of the screen. Separately converting the screens of the first and second displays 190a, 190b indicates that the screen of the first display 190a and the screen of the second display 190b can be separately controlled without affecting each other, and does not indicate that the screens should be controlled separately. According to the situation, the screens displayed on the first and second displays 190a, 190b may be interoperated and converted.

FIG. 9 illustrates an exemplary embodiment of a screen conversion by sensing rotation.

Referring to FIG. 9(1), the first display 190a and the second display 190b display different screens from each other while operating based on the orthogonal to the hinge 185. The screens displayed on the first and second displays 190a, 190b may be, for example, a home screen as an initial screen, or an implement screen which several separate applications implement.

The multi-display apparatus 100 rotates by 90° clockwise. The rotation recognizing sensor senses rotation of the multi-display apparatus 100 and generates a rotating event. The controller 130 adjusts the first and second screen data of the first and second frame buffers by using the sensed rotation and rotating information. The adjusted first and second screen data are outputted by the first and second displays 190a, 190b.

Referring to FIG. 9(2), the multi-display apparatus 100 in which the adjusted first and screen data are outputted is illustrated. The multi-display apparatus 100 rotates by 90° clockwise; the first display 190a is now positioned above the hinge 185 and the second display 190b is positioned beneath the hinge 185. Accordingly, the first and second displays 190a, 190b display screen rotated by 90° counterclockwise.

Figure 10:
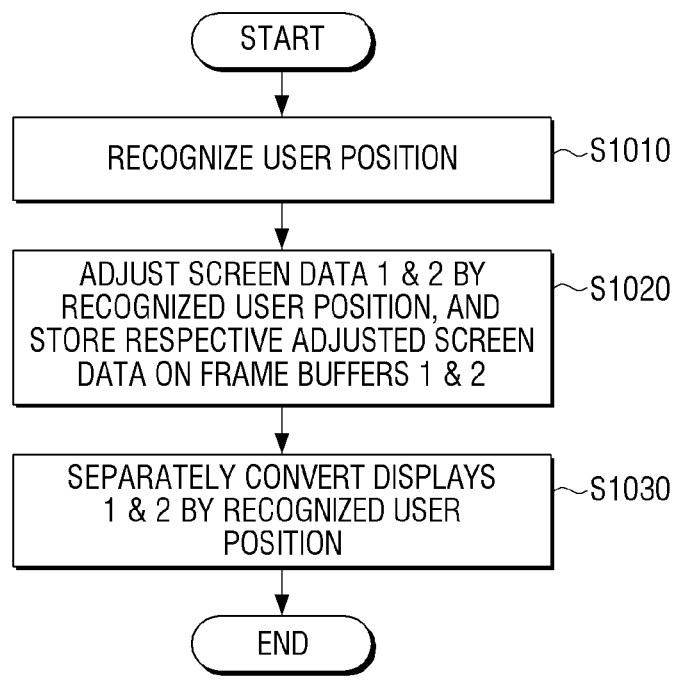
FIGS. 10 to 12 are views illustrating screen converting by user recognition according to an exemplary embodiment of the present general inventive concept.

FIG. 10 is a flowchart illustrating a screen conversion method by recognizing a user according to an exemplary embodiment.

Referring to FIGS. 10 and 2, the sensors 150a, 150b recognize a user position at operation S1010. The sensors 150a, 150b may include user recognizing sensors which recognize user position. For example, the user recognizing sensor may be an ultrasonic wave sensor or an infrared sensor. Further, although the photographers 141, 142 may normally not be considered as sensors, however, within a range that a user position is recognized by using the photographed image of a user, they may be defined as one unit of the user recognizing sensor.

The controller 130 adjusts the first and second screen data according to the recognized user position and stores the adjusted screens in the first and second frame buffers 171a, 171b respectively at operation S1020. In other words, the first and second screen data are adjusted so that forward directed screens can be viewed from the recognized user position. For example, regarding general English texts, the forward directed screen arranges characters left to right and connects one line with a lower line at the end of the line while characters are not turned over or sideways from a view point of a user. Regarding images, a forward directed screen indicates that upper image areas are positioned on the upper part of the screen and lower image areas are positioned on the lower part of the screen from a view point of a user.

The controller 130 separately converts screens of the first and second displays 190a, 190b according to the recognized user position at operation S1030. As described above, separately converting the screens of the first and second displays 190a, 190b indicates that the screen of the first display 190a and the screen of the second display 190b can be separately controlled without affecting each other, and does not indicate that the screens should necessarily be separately controlled. According to the situation, the screens displayed on the first and second displays 190a, 190b may be interoperated and converted.

Figure 11:
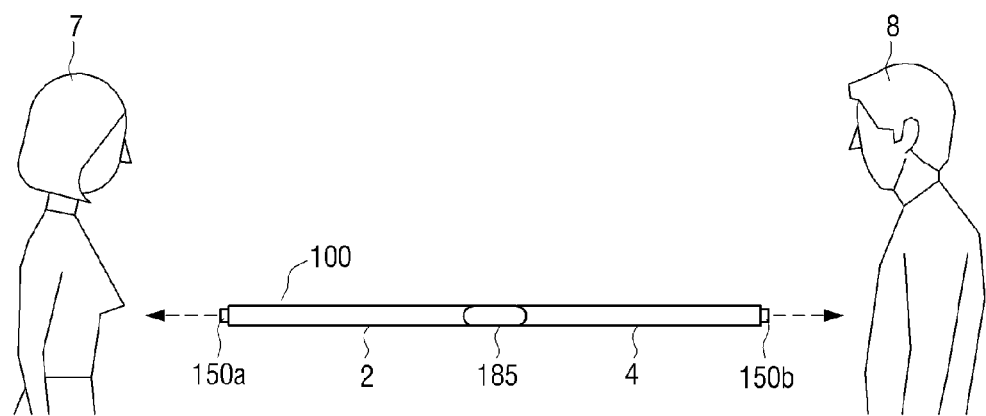

FIG. 11 illustrates a screen conversion method which recognizes user position by using the user recognizing sensor according to an exemplary embodiment.

Referring to FIG. 11, the multi-display apparatus 100 includes the first body 2 and the second body 4. The first body 2 and the second body 4 are connected by the hinge 185. The first sensor 150a may be mounted on the side of the first body 2 opposite the hinge 185, and the second sensor 150b may be mounted on the side of the second body 4 opposite the hinge 185. Positions of the first and second sensors 150a, 150b are not limited to those illustrated in FIG. 11, and may be arranged any place where user position can be recognized.

The first and second sensors 150a, 150b may include user recognizing sensors which can recognize user position. For example, the user recognizing sensor may be an infrared sensor or an ultrasonic wave sensor. As described above, within a range that a user position can be recognized by using the photographed image of a user, the photographer 141, 142 of FIG. 2 can be considered as one unit of the user recognizing sensor. The photographer will be further described below.

The infrared sensor may sense a user using any of various methods. Examples of the infrared sensors include a pyroelectric infrared ray sensor (PIR sensor) and a reflecting infrared sensor. The PIR sensor may recognize a user by sensing infrared rays emitted from a human body. The reflecting infrared sensor includes a light emitter and a light receiver, and may recognize a user by sensing reflecting infrared rays in the light receiver when infrared rays outputted from the light emitter reflect from a user.

An ultrasonic wave sensor may recognize a user position by outputting ultrasonic waves and sensing sound waves reflecting from a user.

In FIG. 11, a first user 7 is positioned on the end of the first body 2 and a second user 8 is positioned on the end of the second body 4. The first and second sensors 150a, 150b including the user recognizing sensor may sense the first and second users 7, 8 respectively. When users are sensed, the controller 130 triggers a rotating event and adjusts screen data of the first and second frame buffers 171a, 171b so that a forward directed screen can be viewed from the respective recognized users. The adjusted screen data are outputted to the first and second displays 190a, 190b. Thus, the multi-display apparatus 100 may convert screen orientation on the displays 190a, 190b by recognizing user position.

Figure 12:
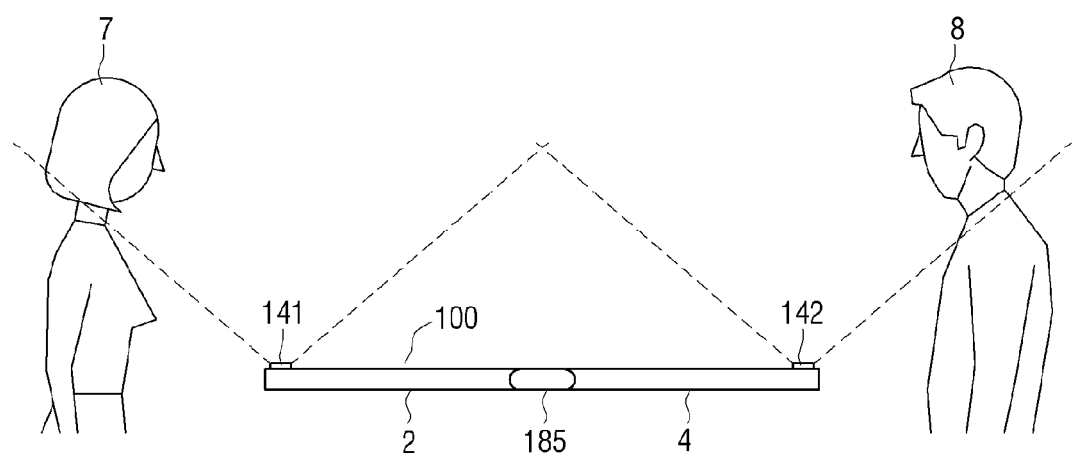

FIG. 12 illustrates a method which recognizes user position by using the photographer and accordingly converts screen orientation according to an exemplary embodiment.

Referring to FIG. 12, structure of the first and second bodies 2, 4 and the hinge 185 in the multi-display apparatus 100 are the same as described in FIG. 11. The first and second users 7, 8 place on the end of the first and second bodies 2, 4, respectively.

The photographers 141, 142 to photograph the users may be arranged on the same side of the displays 190a, 190b. Because the photographers 141, 142 may be used in various ways, including a case which confirms user position, they may be arranged by considering this point. Embodiments related with arranging the photographers 141, 142 will be described below.

As illustrated in FIG. 12, the first photographer 141 photographs a user standing near the first body 2 and the second photographer 142 photographs a user standing near the second body 4. The controller 130 may recognize user position by using the photographed image by the photographers 141, 142. For example, information regarding recognizing objects such as human shapes, face contours, eyes, noses, or mouths may be previously stored, and a user position may be recognized by matching the photographed image with the prestored recognizing objects. Rotating information to convert a screen displayed on the display may be obtained by establishing a direction which the recognized user places to be the lower direction of the screen. Details of the screen conversion method have already been described above and will not be further explained.

Therefore, the multi-display apparatus 100 may recognize user position by using the photographers 141, 142, and convert screens of the first and second displays 190a, 190b according to the recognized user position.

FIG. 13 illustrates various exemplary embodiments of screen conversions by recognizing a user.

Referring to FIG. 13(1), the first user 7 stands near an edge area of the first display 190a opposite to the hinge 185. The second user 8 stands near an edge area of the second display 190b opposite to the hinge 185, facing the first user 7. Therefore, as in the illustration of FIG. 12, the screen of the first display 190a is converted on a forward direction from a view point of the first user 7, and the screen of the second display 190b is converted on a forward direction from a view point of the second user 8.

Referring to FIG. 13(2), the first user 7 stands near an edge area of the first display 190a adjacent to the hinge 185. The second user 8 stands near an edge area of the second display 190b opposite the hinge 185. Therefore, the screen of the first display 190a is converted to a forward direction from a view point of the first user 7, and the screen of the second display 190b is converted to a forward direction from a view point of the second user 8.

Referring to FIG. 13(3), the hinge 185 is mounted on an orthogonal direction in the multi-display apparatus 100. The first user 7 stands near an edge area of the first display 190a adjacent to the hinge 185. The second user 8 stands near an edge area of the second display 190b adjacent to the hinge 185, in a direction facing the first user 7. Thus, the screen of the first display 190a is converted to a forward direction from a view point of the first user 7, and the screen of the second display 190b is converted to a forward direction from a view point of the second user 8.

Referring to FIG. 13(4), the hinge 185 is mounted on an orthogonal direction in the multi-display apparatus 100. The first user 7 stands near an edge area of the first display 190a adjacent to the hinge 185. The second user 8 stands near an edge area of the second display 190b adjacent to the hinge 185, facing the same direction as the first user 7. Thus, the screen of the first display 190a is converted on a forward direction from a view point of the first user 7, and the screen of the second display 190b is converted on a forward direction from a view point of the second user 8.

User position may therefore be recognized by using the user recognizing sensor. As described above, the infrared sensor and the ultrasonic wave sensor may operate as user recognizing sensor. Further, within range that user position may be recognized by photographing a user, the photographers 141, 142 can be considered as one unit of the user recognizing sensor. However, the method of converting a screen by using the photographed image is not limited to the method of recognizing user position and converting screen. A method of converting screen by photographing movements of a user on a space and recognizing space gestures can be used. Before further explaining, various embodiments regarding the photographer arrangement will be described.

FIGS. 14 to 17 illustrate arrangements of the photographers 141, 142 in the multi-display apparatus 100 according to various exemplary embodiments.

Because these are provided to explain the arrangement of the photographers 141, 142, other units are excluded from the following description.

Figure 14:
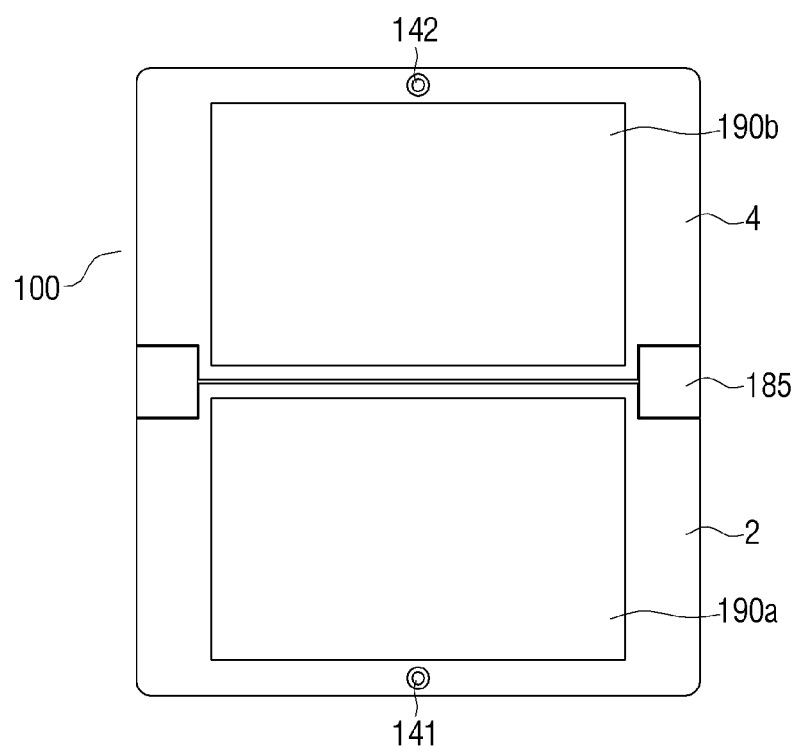
FIGS. 14 to 17 are views illustrating examples which arrange photographers of a multi-display apparatus according to various exemplary embodiments.

First, referring to FIG. 14, the multi-display apparatus 100 comprises the first body 2 and the second body 4. The first body 2 includes the first display 190a and the second body 4 includes the second display 190b. The first body 2 and the second body 4 are connected via hinge 185 so that they can move relatively. The first photographer 141 may be mounted on a center of the edge area counter to the hinge 185 among the edge area of the first body 2. The second photographer 142 may be mounted on a center of the edge area counter to the hinge 185 among the edge area of the second body 4.

Figure 15:
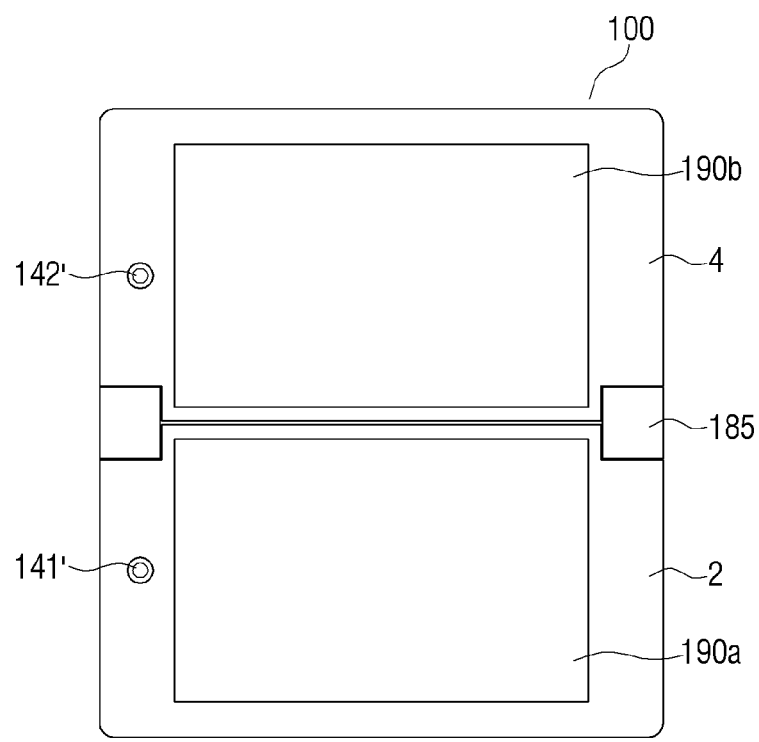

Referring to FIG. 15, a direction from which a user views the multi-display apparatus 100 is considered to be a relative basis for describing an arrangement in another exemplary embodiment. A first photographer 141' may be mounted on a center face of the left edge area in the first body 2, and a second photographer 142' may be mounted on a center face of the left edge area in the second body 4. According to another exemplary embodiment, the first and second photographers 141', 142' may be mounted on a center face of the right edge area in the first and second bodies 2, 4, respectively. Further, the first and second photographers 141', 142' may be mounted on the corner area in the first and second bodies 2, 4, respectively. The multi-display apparatus 100 may be used vertically as well as horizontally.

If the first and second photographers 141', 142' are arranged on the left or the right edge area in the first and second bodies 2, 4, a user has convenience in inputting a command to the multi-display apparatus 100 by using space gestures with a left or right hand and touching a touch screen with another hand.

Figure 16:
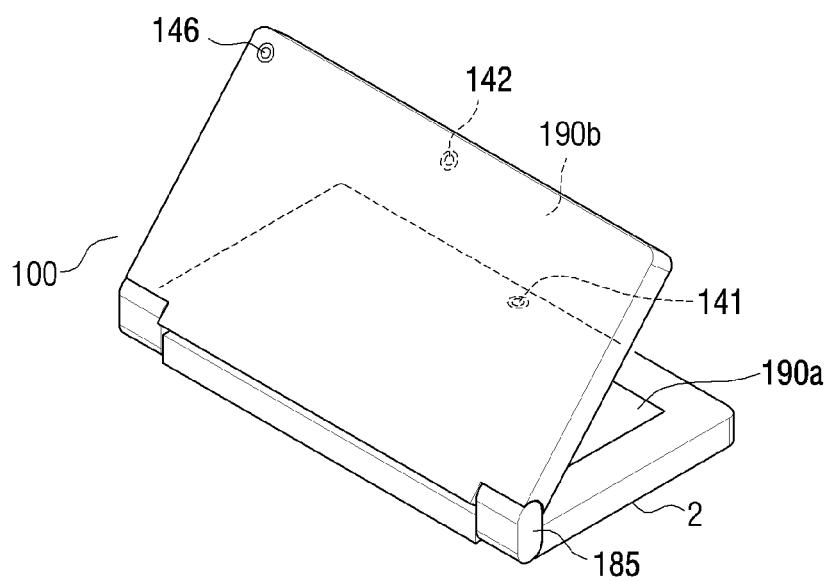

FIG. 16 illustrates the multi-display apparatus 100 including three photographers according to another exemplary embodiment.

Referring to FIG. 16, the first photographer 141 is arranged on the same side upon which the first display 190a of the first body 2 is arranged, and the second photographer 142 is arranged on the same side upon which the second display 190b of the second body 4 is arranged. A third photographer 146 is arranged on the side opposite to the side upon which the second display 190b of the second body 4 is arranged. Although FIG. 15 illustrates the multi-display apparatus 100 having the first and second photographers 141, 142 arranged on a center of the edge area facing the hinge 185, it need not be limited as such. For example, the first and second photographers 141, 142 may be respectively arranged on a center of the edge area on any one side among the edge areas of the first and second bodies 2, 4 or on the corner area which does not contact to the hinge 185. The third photographer 146 is not limited to be arranged on the corner of one side opposite to the side which the second display 190b of the second body 4 is placed. For example, it may be arranged on the opposite corner area or on the center area.

If more than three photographers are arranged, two photographers mounted on the same side upon which the displays 190a, 190b are mounted may be used for recognizing user position or space gestures, and other photographers may be used for another operation such as image photographing and video photographing.

Figure 17:
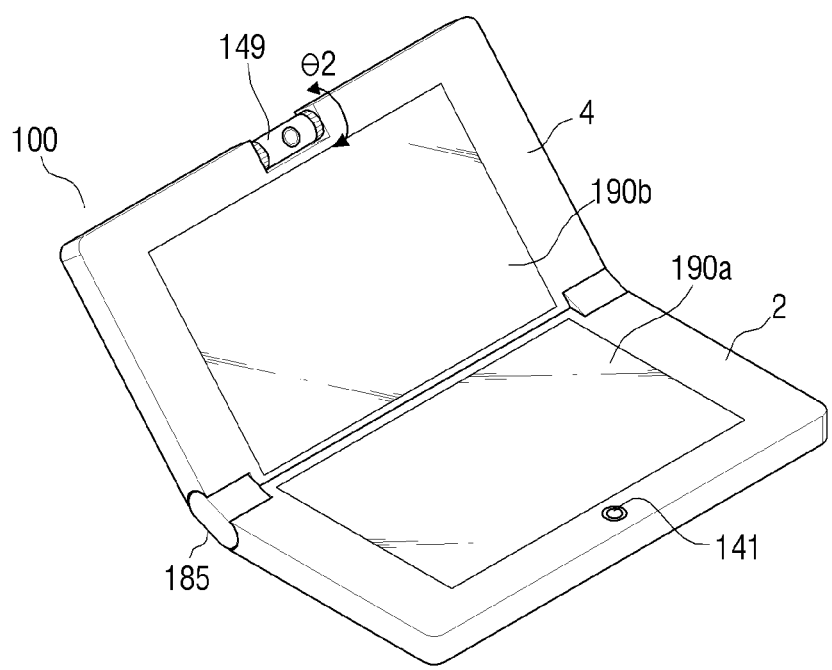

FIG. 17 illustrates the multi-display apparatus 100 including a rotating photographer 149 that can rotate according to an exemplary embodiment.

Referring to FIG. 17, the first photographer 141 is formed on a center of the edge area of the first body 2 opposite to the hinge 185, and a rotating photographer 149 is formed on a center of the edge area of the second body 4 opposite to the hinge 185. The rotating photographer 149 may connect to a hinge that can rotate relative to the second body 4. Thus, the rotating photographer 149 may rotate within an angle of 82.

A method of rotating the rotating photographer 149 may be passive, in which a user directly rotates the device, or automatic in which the device rotates by predetermined value on predetermined conditions. Otherwise, both methods, i.e., the passive and automatic methods can be operated. The rotating photographer 149 may rotate to the contrary side of the second display 190b automatically or passively so as to photograph external image, or may rotate to the same side of the second display 190b automatically or passively so as to recognize user position or space gestures.

FIGS. 14 to 17 illustrate exemplary embodiments of the multi-display apparatus 100 having various numbers or arrangements of photographers. The number of photographers is not limited to that illustrated in the drawings, and the arrangement of photographers is not limited to the described arrangement.

A specific method of converting a screen by recognizing space gestures will be described below.

Figure 18:
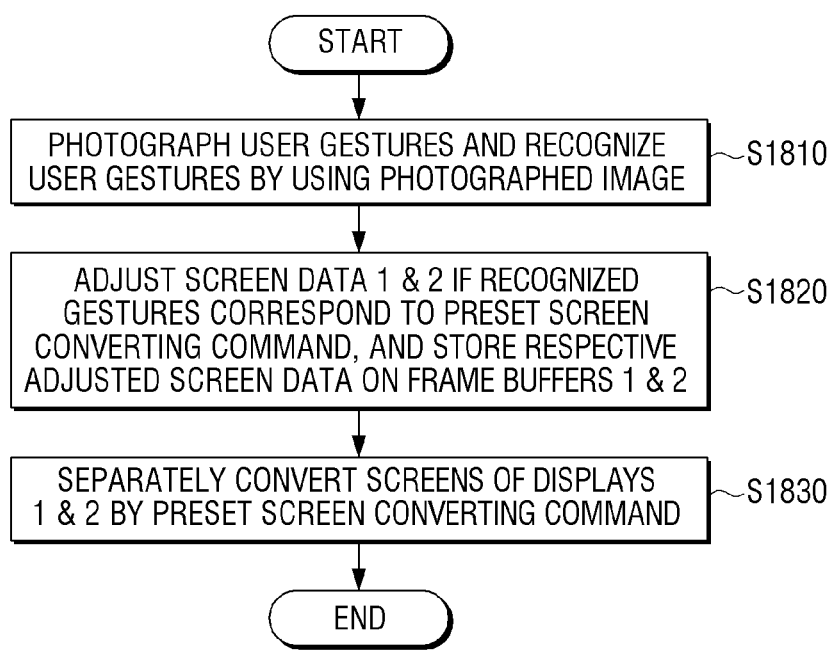
FIG. 18 is a flowchart illustrating a screen converting method by space gestures recognition according to an exemplary embodiment of the present general inventive concept.

FIG. 18 is a flowchart illustrating a screen converting method by recognizing space gestures according to an exemplary embodiment.

The above-described photographers may photograph or video user gestures, i.e., user movements within a space. The controller 130 recognizes user gestures by using the photographed images or video at operation S1810. In order for the controller 130 to examine movements of a user, at least three image frames are preferable. However, when a fast moving object is photographed, at least 5~6 image frames are preferable because blurring which shows the object shape vaguely may happen.

For example, one user moves left to right. The photographers capture movements of a user in several image frames. The controller 130 of the multi-display apparatus 100 examines shapes or movements of a user and recognizes gestures by using, for example, at least three images. When a gesture is recognized, operation corresponding to the recognized gesture is performed.

If the recognized gesture corresponds to a predetermined command to convert the screen, the controller adjusts the first and second screen data, and stores the adjusted screen data on the first and second frame buffers respectively at operation S1820. According to the predetermined command to convert the screen, the controller separately converts screens of the first and second displays at operation S1830. Specific related processes are already described and will not be further explained.

Figure 19:
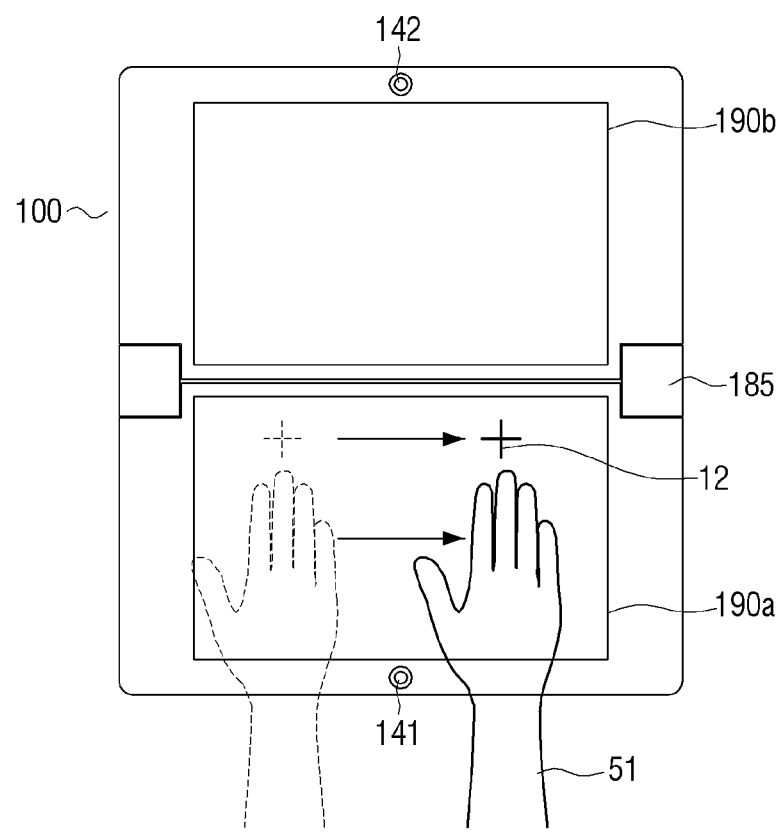
FIG. 19 illustrates screen in gesture recognizing mode according to an exemplary embodiment of the present general inventive concept.

FIG. 19 illustrates a multi-display apparatus 100 in gesture recognizing mode according to an exemplary embodiment.

Referring to FIG. 19, a user moves within photographing range of the first photographer 141. The first photographer 141 captures movements of a user 51 to recognize gestures; however, the first display 190a may display general contents such as home, menu, and icons. Therefore, because a user may have difficulty in perceiving his position on the first display 190a corresponding to his movements, a pointer 12 corresponding to user movements is displayed. The pointer 12 may be displayed in cross shape as illustrated, or other various shapes such as arrow or hand. Otherwise, a user can establish customized shape. When a user 51 moves left to right, the corresponding pointer 12 moves left to right. Thus, a user can intuitively perceive gestures.

Although FIG. 19 illustrates that object 51 is one user, object 51 may be more than two users. When there are two or more users, the pointer 12 may include two or more icons corresponding to the number of users.

The above may be applied uniformly to a process capturing user movements in the second photographer 142 so as to recognize gestures near the second display 190b.

Further, so that a user can perceive the gesture recognizing mode, the multi-display apparatus 100 may mark an icon 12 on the screen of the first or second displays 190a, 190b. The icon may be another icon that helps a user to perceive the gesture recognizing mode, or characters such as 'gesture' or 'G'. Outside of the displays 190a, 190b of the first and second bodies 2, 4, a notification of gesture recognizing mode may be displayed by using another indicator, such as, for example, a light emitting diode (LED).

Further, when the multi-display apparatus 100 including a touch screen operates in the space gesture recognizing mode, a user can input a command by touching the touch screen or making a gesture or mark on the touch screen, as well as using space gestures.

Figure 20:
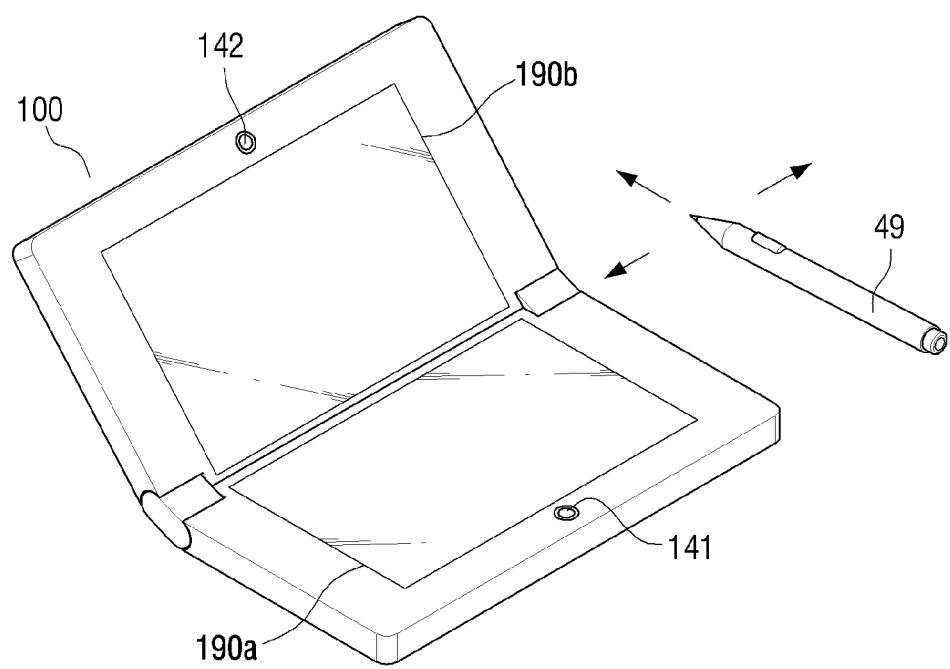
FIG. 20 is a view illustrating a command inputting method by using pens according to an exemplary embodiment of the present general inventive concept.

FIG. 20 illustrates an inputting method of using a stylus according to an exemplary embodiment.

Referring to FIG. 20, methods of inputting gestures into the multi-display apparatus 100 may include means other than user hands, such as the use of a stylus 49. A stylus 49 may have a simple structure which does not include other functions, or structure which includes coils for near field sensing, or a more complex structure which includes other additional functions.

The multi-display apparatus 100 may recognize user hands and a stylus 49 as one inputting means without separating a user's hand from the stylus 49. Further, as described above, it may separately recognize a stylus 49 from a user's hand by recognizing the stylus 49 shape with the photographers 141, 142.

A user may operate the multi-display apparatus 100 to recognize gestures while using hands, and after, using a stylus 49. The contrary process can also be operated. In this case in which inputting means changes, the multi-display apparatus 100 may display notification saying that the currently recognized inputting means have changed and a new inputting means is recognized. Further, without displaying notification, it may display changes of inputting means by converting shape or color of a user interface (UI) object such as a pointer displayed on the display 190a, 190b. Alternatively, without displaying any notification or converting, the multi-display apparatus 100 may recognize inputting means changes internally.

The method of recognizing gestures and operating in the multi-display apparatus 100 may be the same as those described in FIG. 18.

Figure 21:
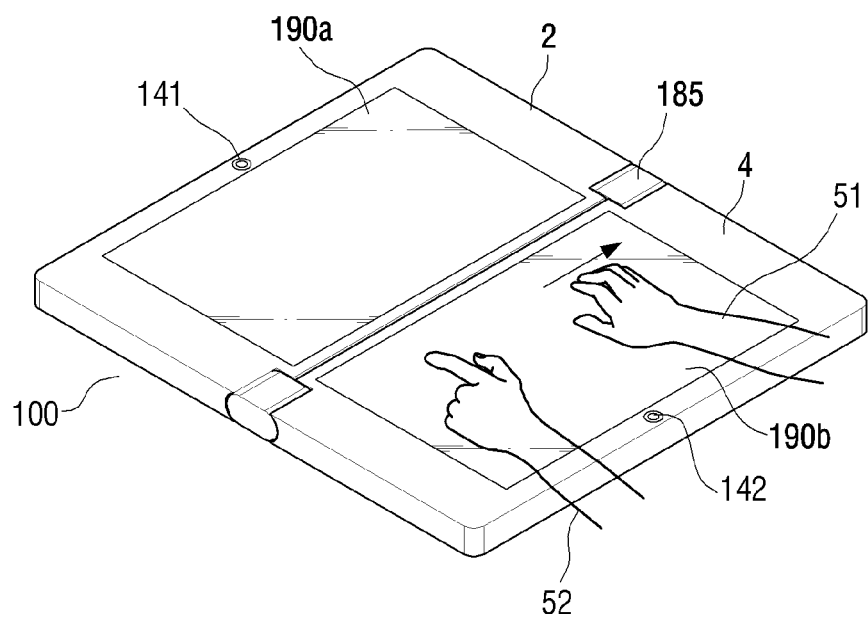
FIGS. 21 to 22 are views illustrating a command inputting method by using a plurality of user objects according to an exemplary embodiment of the present general inventive concept.
Figure 22:
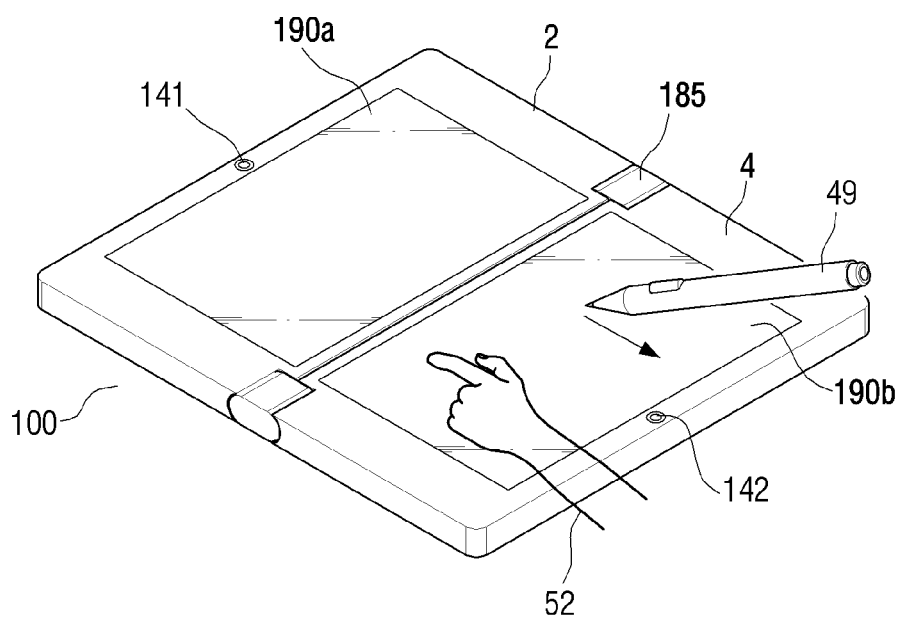

FIGS. 21 to 22 illustrate a command inputting method of using a plurality of users according to an exemplary embodiment.

Referring to FIG. 21, the multi-display apparatus 100 may recognize both hands of a user as objects and movements of both hands as space gestures. Referring to FIG. 20, two user objects 51, 52 move within photographing range of the second photographer 142. The multi-display apparatus 100 recognizes gestures by examining movements of the captured two user objects 51, 52 and performs operations corresponding to the gestures.

For example, when a plurality of applications operate on the second display 190b, applications may be classified into two groups. Users can optionally convert an orientation of only one group among the classified two groups. Users may perform hold gestures by using one hand 52 regarding a group which they intend to maintain the present orientation, and perform screen convert gestures by using another hand 51 regarding a group for which they intend to convert orientation. The controller 130 may perform the corresponding command by recognizing gestures of the plural user objects. In this scenario, an orientation of only one group will be converted. An embodiment of a UI screen which converts per group will be described below.

Referring to FIG. 22, one object is a hand of the user 52, and the other object is the stylus 49. A plurality of objects may be used concurrently, for example, both hands of the user, the stylus and a hand of the user, or two styluses.

A method of inputting a command into the multi-display apparatus 100 by using user space gestures has been described. A method of converting a display screen of the display by using space gestures will be described in greater detail below.

Figure 23:
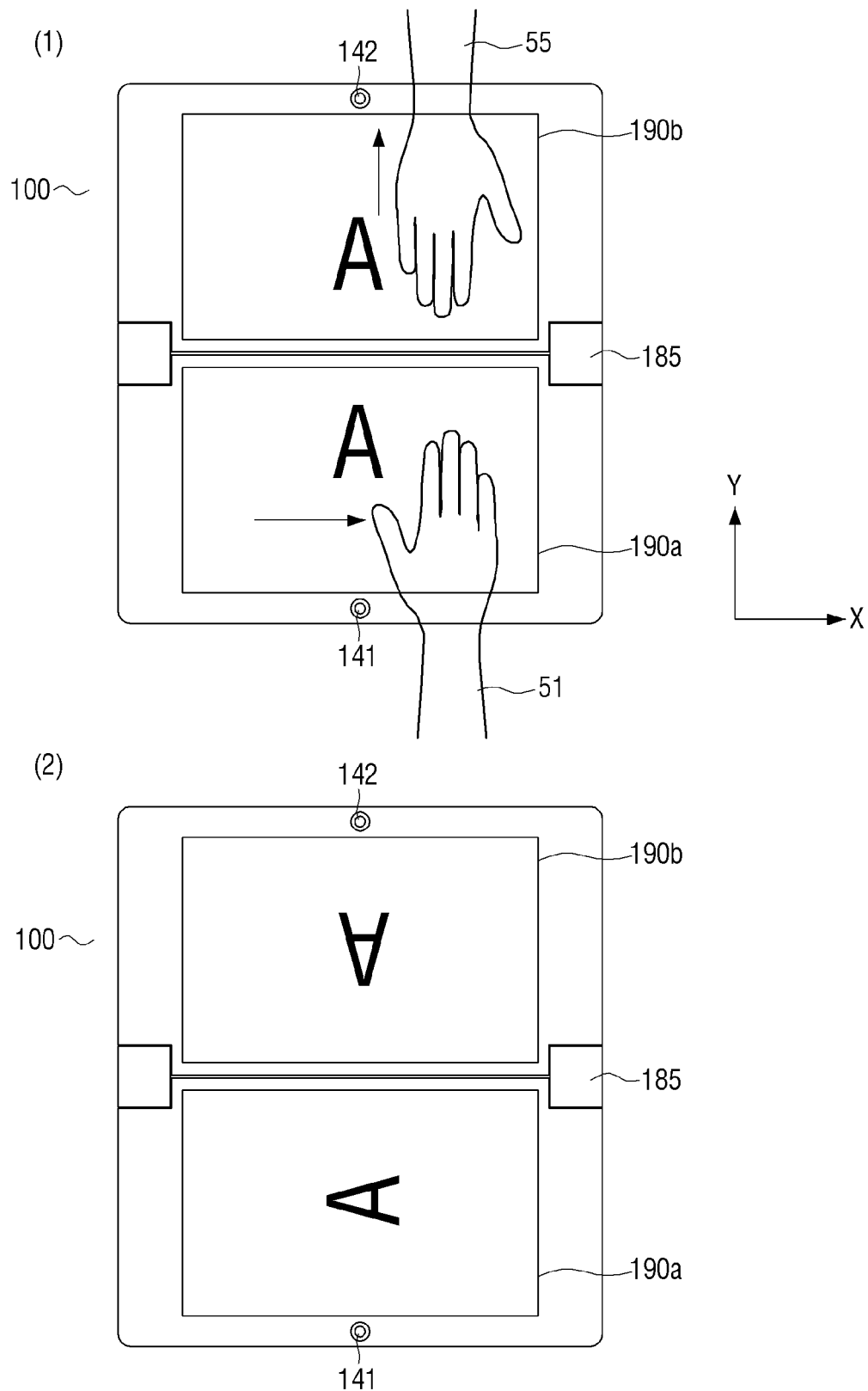
FIG. 23 is a view illustrating screen converting by using space gestures according to an exemplary embodiment of the present general inventive concept.

FIG. 23 illustrates screen conversion by using multiple, concurrent space gestures according to an embodiment.

Referring to FIG. 23(1), the multi-display apparatus 100 is laid down by spreading the first display 190a and the second display 190b based on the hinge 185. The first photographer 141 is formed on a center of the edge area on one side which does not contact to the hinge 185 among the edge area of the first body 2. The second photographer 142 is formed on a center of the edge area on one side which does not contact to the hinge 185 among the edge area of the second body 4. Assume that a first user stands near the side upon which the first photographer 141 is mounted and a second user stands near a side upon which the second photographer 142 is mounted.

The first and second displays 190a, 190b display forward directed screen from a view point of the first user. Screens displayed on the first and second displays 190a, 190b may be uniform or different. Further, they may be home screen as initial screen of the multi-display apparatus 100 or implement screen which specific applications implement.

The first user moves a first user object 51, i.e., his, in a direction parallel to the X-axis. The second user moves a second user object 55, i.e., his hand, in a direction parallel to the Y-axis. The first photographer 141 photographs movements of the first user object 51 and the second photographer 142 photographs movements of the second user object 55. The controller 130 recognizes user gestures by using images of the first and second user objects 51, 55. In FIG. 23, assume that directing a palm toward the display 190b, 190a and moving the hand to a specific direction are gestures corresponding to a screen conversion command. Accordingly, the controller 130 recognizes that movements of the first user object 51 are a command to convert screen orientation to X-axis. Further, the controller 130 recognizes that movements of the second user object 55 are a command to convert screen orientation to Y-axis.

Referring to FIG. 23(2), the first display 190a is converted to an X-axis orientation, and the second display 190b is converted to a Y-axis orientation opposite to its original orientation. In other words, the controller 130 adjusts the first and second screen data responding to the recognized command. The adjusted screen data are stored in the first and second frame buffers 171a, 171b, and the stored first and second screen data are outputted to the first and second displays 190a, 190b respectively.

Space gestures corresponding to a command to convert screen orientation may be established with various movements of user objects. For example, the command may correspond to movements of spreading a hand, directing a palm toward the display 190a, 190b, and moving the hand toward a specific direction. Alternatively, the command may correspond to movements of using one finger and moving the finger in a straight direction. Further, it may correspond to movements of using one finger and rotating the finger toward a specific direction. It may also correspond to movements of using two fingers and rotating the two fingers toward the same direction. The above movements are only examples of space gestures that could correspond to a command to convert a screen orientation; other movements may correspond to the command.

When space gestures corresponding to a command to convert a screen orientation is established uniformly with touch gestures, a user can make adjustments with convenience. Furthermore, so that a user can establish and use unique gestures corresponding to a command to convert screen, the multi-display apparatus 100 may include a gesture setting menu.

Space gestures may be recognized by using a near field sensor as well as by using the photographed image.

Figure 24:
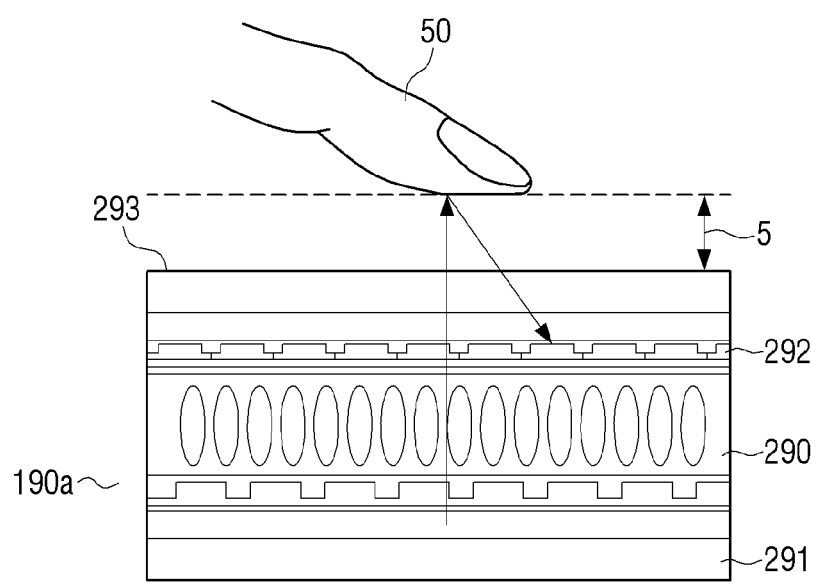
FIGS. 24 to 25 are views illustrating a method of sensing near field touches of the general inventive concept.
Figure 25:
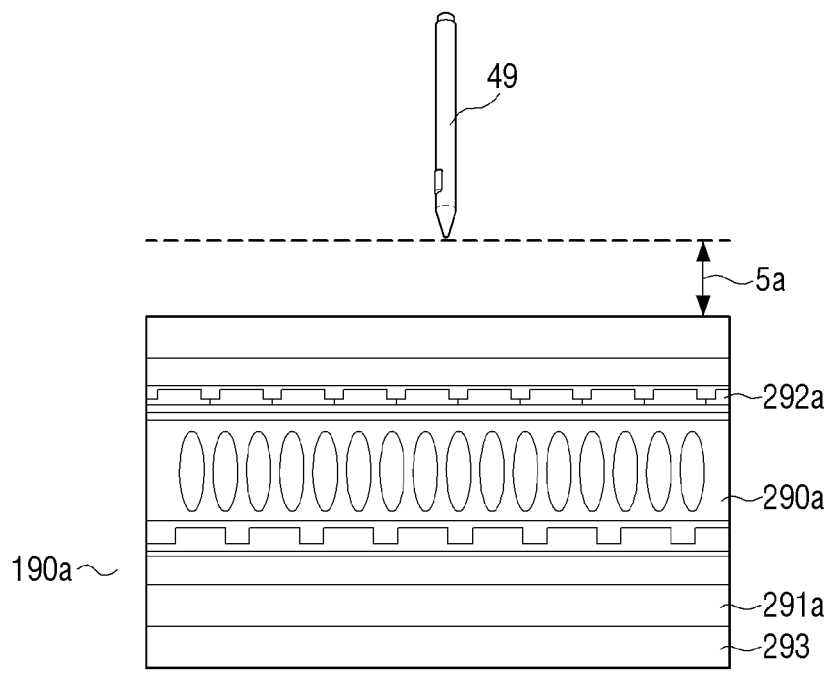

FIGS. 24 to 25 illustrate methods of sensing near field touches according to exemplary embodiments.

A user may input a command into the multi-display apparatus 100 with a near field touch method of using a near field sensor. Near field touches indicate recognizing gestures within a determined effective recognizing range of a space without directly touching a screen.

Referring to FIG. 24, display 190a includes a display panel 290, an infrared source 291, and an infrared sensor 292. The infrared source 291 radiates in a surface 293 direction of the display 190a. Specifically, the infrared source 291 may be formed beneath the display panel 290 which displays video or image, and can radiate infrared rays toward a surface 293 direction of the display 190a. Above the display surface 293, a determined area that can recognize the approach of a user object 50 is formed. This area is effective recognizing area 5, within which the multi-display apparatus 100 can recognize near field touch.

User objects indicate means to input a command to the multi-display apparatus 100, for example, a part of a body such as a hand or finger may serve as a user object.

If user object 50 approaches within range of the effective recognizing area 5, the infrared sensor 292 generates an infrared scan image by sensing infrared rays reflected from approaching of the user object 50. Specifically, the infrared sensor 292 may generate an infrared scan image corresponding to infrared rays reflected from the approaching user object 50 by using a plurality of infrared sensing components arranged in an array format. The multi-display apparatus 100 may sense a near field touch input by using the generated infrared scan image.

FIG. 25 illustrates a method of sensing near field touches according to another exemplary embodiment. A user can input a controlling command to the multi-display apparatus 100 with the near field touch method of using a specific pen or stylus.

Referring to FIG. 25, a display panel 290a, a near field source 291a and a sensor 292a described in FIG. 23 are included. The stylus 49 may include coils so as to recognize near field touches by using a specific stylus. The display 190a includes an electrostatic sensor 293. The electrostatic sensor 293 may include a plurality of coils.

If the stylus 49 including coils approaches within a certain distance 5a, coils of the electrostatic sensor 293 induces electrical currents by electrostatic induction. Electrical currents are most greatly induced in coils near to the stylus 49, and decreasingly induced in coils away from the stylus 49. Therefore, the controller recognizes a point at which the biggest electrical currents are induced as a position where the stylus 49 is positioned.

Because the display illustrated as FIG. 25 includes the infrared sensor 292a, both of the infrared sensor 292a and the electrostatic sensor 293 recognize approaching of the stylus 49 when the stylus 49 approaches within a certain distance. Therefore, a problem of double recognition may be solved, for example, by prioritizing approaching recognition of the electrostatic sensor 293 first.

Figure 26:
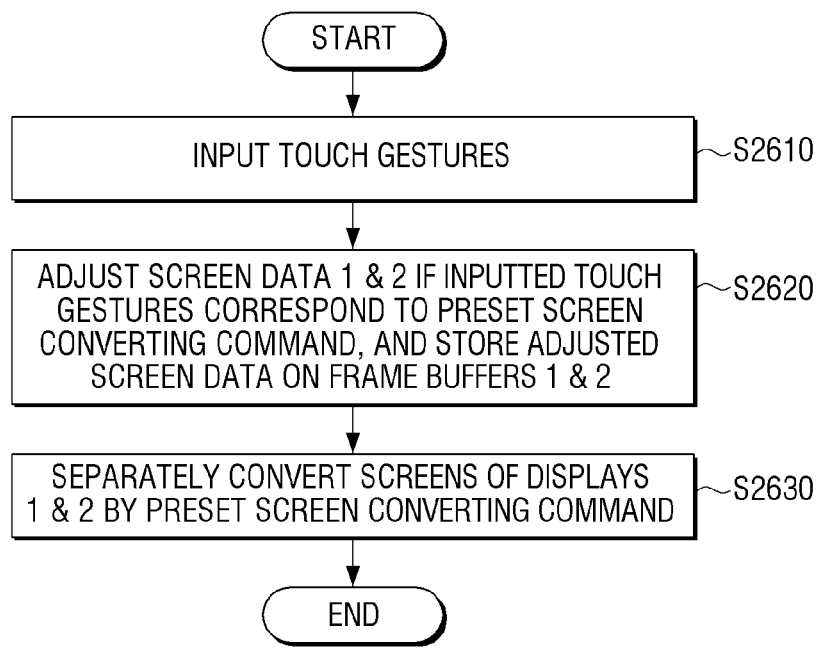
FIG. 26 is a flowchart illustrating a screen converting method by touch gestures according to an exemplary embodiment of the present general inventive concept.

FIG. 26 is a flowchart illustrating a screen converting method according to an embodiment.

Referring to FIGS. 2 and 26, touch sensor of the touch screen receives touch gestures at operation S2610. Touch gestures corresponding to a command to convert a screen orientation may be established uniformly with space gestures. In other words, the command may correspond to, for example, movements of spreading a hand, directing a palm to the screen, and moving the hand toward a specific direction. Otherwise, the command may correspond to movements of using one finger and moving the finger toward a straight direction. Further, it may correspond to movements of using one finger and rotating the finger toward a specific direction. It may also correspond to movements of using two fingers and rotating the two fingers toward the same direction. The above movements are only examples of gestures corresponding to a command to convert screen; other movements may correspond to the command.

The controller 130 determines whether the inputted touch gestures correspond to a preset command to convert the screen orientation. When inputted gestures correspond to a screen converting command, the first and second screen data are adjusted, and the adjusted screen data are stored in the first and second frame buffers 171a, 171b, respectively at operation S2620. According to the preset command to convert screen, the controller 130 separately converts screens of the first and second displays 190a, 190b at operation S2630.

Embodiments of converting a screen orientation will be described below.

Figure 28:
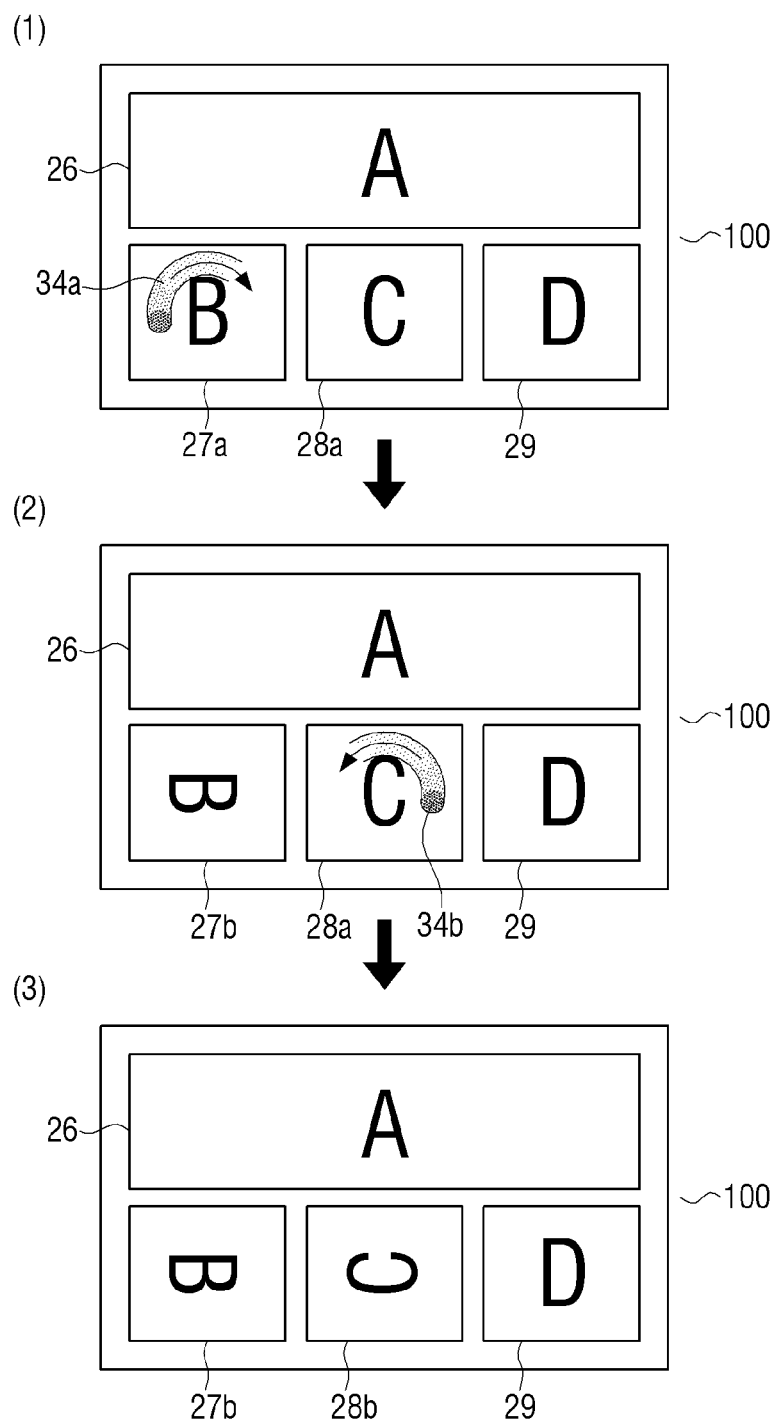
Figure 29:
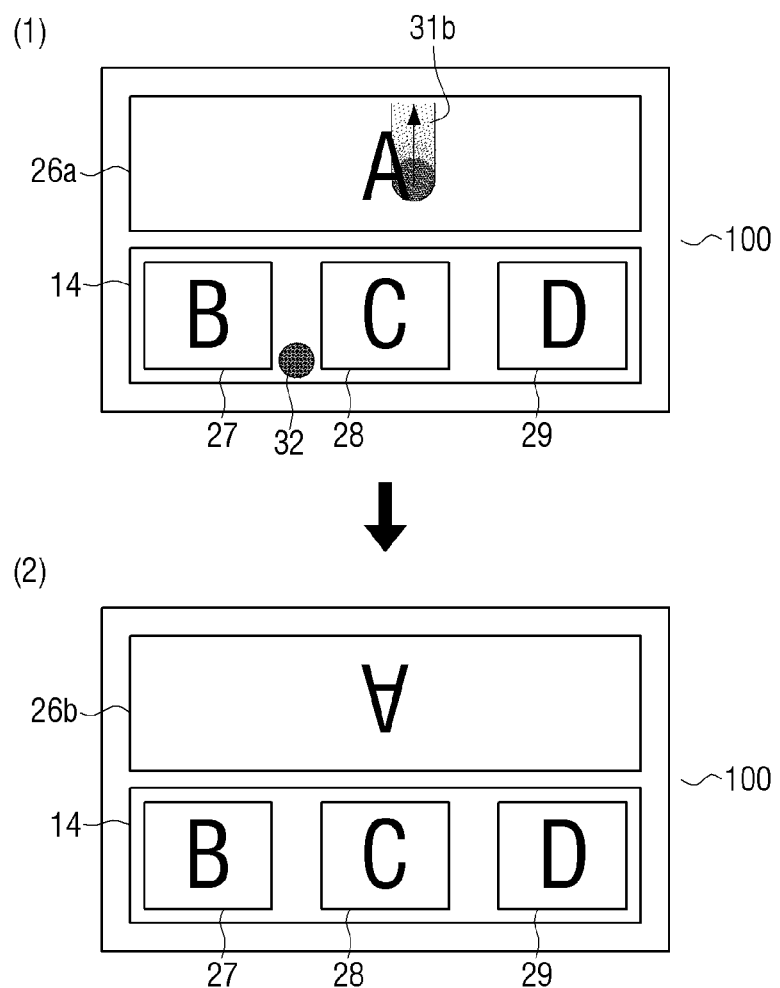

FIGS. 27 to 29 illustrate various embodiments of screen orientation conversions by gestures.

FIG. 27 illustrates an embodiment of converting a whole screen displayed on the display. Referring to FIG. 27(1), the multi-display apparatus 100 spreads based on the hinge 185. Assume that a user stands on a direction of the hinge 185 in the lower of the multi-display apparatus 100. The first and second displays 190a, 190b display a forward directed screen from a view point of a user. Screens displayed on the first and second displays 190a, 190b may be the same or different to each other. Further, they may be a home screen as an initial screen of the multi-display apparatus 100, or an implement screen which specific applications implement.

A user performs screen converting gestures 31a in which a user moves a user object straightly left to right so as to convert the screen displayed on the second display 190b. As described above, screen converting gestures are not limited to the movements illustrated in the drawing; various movements may be established as screen converting gestures.

Referring to FIG. 27(2), because the first display 190a did not receive any command, its screen orientation is maintained. The second display 190b displays a screen rotated toward a right direction, corresponding to the screen converting gestures 31a. Likewise, even when the screens displayed on the first and second displays 190a, 190b are home screens, the screen of the second display 190b can be separately controlled from the first display 190a. A user may reconvert the screen displayed on the second display 190b and separately convert the screen displayed on the first display 190a in the display screens illustrated in FIG. 27(2).

FIG. 28 illustrates a method of converting a plurality of applications respectively displayed on one screen.

Referring to FIG. 28(1), applications of A (26), B (27a), C (28a) and D (29) are displayed on one screen. The applications of A (26), B (27a), C (28a) and D (29) may be implemented in windows or in an icon state before being implemented. The plurality of applications displayed on one screen can be controlled separately. In FIG. 28(1), a user performs movements of a screen converting gesture 34a which rotates application B 27a clockwise.

Referring to FIG. 28(2), the applications of A (26), C (28a) and D (29) which do not receive a command are kept in previous situation. However, application B (27b), which received a screen converting command, is rotated by 90° clockwise and displayed on screen.

In this situation, a user may proceed to separately convert application orientations again. As shown in FIG. 28(2), a user performs movements of screen converting gesture 34b, which rotates C application 28a counterclockwise.

Referring to FIG. 28(3), the applications of A (26) and D (29) which do not receive any command so far are still kept in their original orientations. Application B (27b), for which a screen converting gestures 34a was inputted for one time, is displayed on screen still rotated by 90° clockwise. Application C (28b), for which the screen converting gesture 34b rotating counterclockwise was inputted, is now displayed rotated by 90° counterclockwise.

FIG. 29 illustrates a method of establishing a plurality of applications displayed on one screen into a plurality of groups and converting per group according to an exemplary embodiment.

Referring to FIG. 29(1), applications of A (26a), B (27), C (28) and D (29) may be displayed on one screen. The multi-display apparatus 100 may classify the plurality of applications displayed on one screen into groups and separately control each group.

A user performs a holding gesture 32 by using one user object. The holding gesture 32 may be established, for example, by pressing and holding the screen with a finger. The holding gesture 32 inputs a command to grip a selected area. When a user performs the holding gesture 32 regarding an area not specific to any particular application, the controller 130 determines that whole area and all applications located therein are selected.

For example, the controller 130 divides one whole screen into parts, such as two parts or four parts. When a holding gesture is not determined to select a specific application, every application represented within the selected area may be controlled so as to be selected and held. Further, areas may be established by referring to the layout arrangement of applications or relative sizes of applications. Alternatively, a user may establish each area voluntarily by selection.

If each area is established, applications represented within the same area may be classified as comprising a group. When applications classified as a group are selected, notification which a user can perceive regarding the group may be outputted. For example, methods by which a user can perceive a group include a method of displaying a boundary around all corresponding applications, a method of converting corresponding applications into the same color, or a method of displaying boundaries of corresponding applications with the same color or the same depth.

Referring to FIG. 29(1), in response to the holding gesture 32 of a user, the applications of B (27), C (28), and D (29) form one group. The controller 130 may display one boundary 14 around the applications of B (27), C (28), and D (29) to express the group. While maintaining holding gesture 32, the user may perform a screen converting gesture 31b regarding application A 26a.

Referring to FIG. 29(2), the held applications of B (27), C (28), and D (29) remain in their previous orientation. Application A 26b, to which a screen converting command was inputted, is displayed on screen in a format converted by 180°.

FIGS. 27 to 28 describe a method of converting whole screens displayed on the first and second displays 190a, 190b respectively and the method of separately converting the plurality of applications displayed on one screen. FIG. 29 describes a method of classifying the plurality of applications displayed on one screen and converting per group. However, the multi-display apparatus 100 may interoperate and convert the screens displayed on the first and second displays 190a, 190b.

FIG. 30 illustrates how screens displayed on the first and second displays 190a, 190b are interoperated and converted according to an exemplary embodiment.

Referring to FIG. 30(1), the first display 190a displays the applications of A, B, C and D. The second display 190b displays the same screen as that displayed on the first display 190a. A, B, C and D may be separate applications to each other, or a plurality of objects included and displayed in one application.

A user performs movements of screen converting gestures 34a only to C application 28a displayed on the first display 190a.

FIG. 30(2) illustrates a converted screen in response to the screen converting gestures 34a of a user. Referring to FIG. 30(2), C application 28b of the first display 190a is rotated by 90° clockwise and displayed in response to the screen converting command of a user. Further, C application 28c of the second display 190b is interoperated with C application 28b of the first display 190a, rotated by 90° clockwise and displayed.

If the screen of the first display 190a is the same as the screen of the second display 190b, the controller 130 may store the second screen data to be displayed on the second display 190b in the second frame buffer 171b as the same data with the first screen data. Therefore, when the first screen data is adjusted in response to the screen converting command of a user, the screens of the first and second displays 190a, 190b may be interoperated and outputted by storing and outputting the adjusted data in the first and second frame buffers 171a, 171b respectively.

Various Embodiments According to Hinge Angles

The multi-display apparatus 100 may include a display apparatus consisting of a first display 190a and second display 190b that can be physically or graphically separated and support various screen modes illustrated in FIGS. 31 to 37 by using the two displays 190a, 190b.

Figure 31:
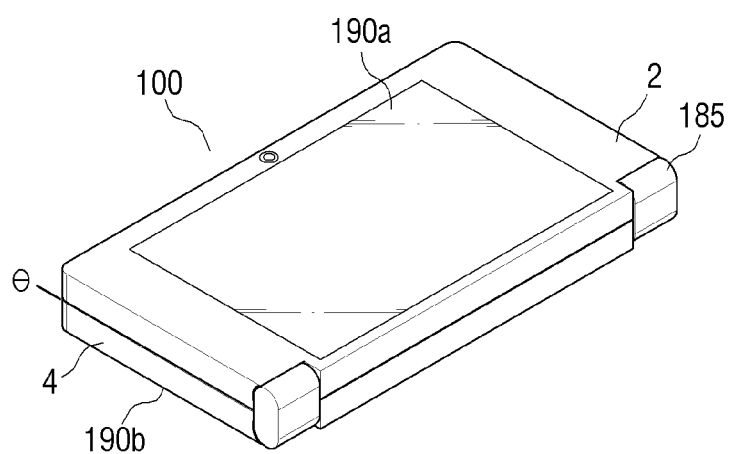
FIG. 31 illustrates single mode of a multi-display apparatus.

FIG. 31 illustrates single mode of the multi-display apparatus 100.

Various modes may be used according to a relative angle between the first body 2 and the second body 4 of the multi-display apparatus 100. Relative angle θ is the rotating angle of the second body 4 which rotates on a specific direction, e.g., counterclockwise toward the first body 2. Specifically, relative angle θ may be examined by a hinge sensor (not illustrated) formed within the hinge 185. The hinge sensor may be constituted to be any one of, for example, a hall sensor, a pressure sensor, an induction examining sensor, an electricity contacting sensor, and an optical sensor, and recognize relative angle θ by examining movements of the hinge and relative position. Further, relative angle θ may be recognized by examining each position of the first and second bodies 2, 4 with a geomagnetic sensor or an acceleration sensor beside the hinge sensor.

Referring to FIG. 31, the first body 2 and the second body 4 contact each other while the first and second displays 190a, 190b of the first and second bodies 2, 4 are counter to each other. In other words, the second display 190b is positioned on the contrary side of the first display 190a. When a user watches the first display 190a, the user cannot directly view the second display 190b because the second display 190b is positioned on the contrary. Thus, the user may view only one display. Relative angle θ is defined as 0° in this situation. In FIG. 31, the fully folded configuration may be referred to as single mode. For example, when relative angle θ between the first and second bodies 2, 4 is 0° to 60°, the multi-display apparatus 100 recognizes the single mode. The single mode may be used helpfully in various situations, for example, when the multi-display apparatus 100 is not used or in a call application. In the single mode, the first display 190 facing the user displays a job screen with at least one application, and the second display 190b to the rear may be turned off. Some applications may optionally turn on the second display 190b to the rear.

Figure 32:
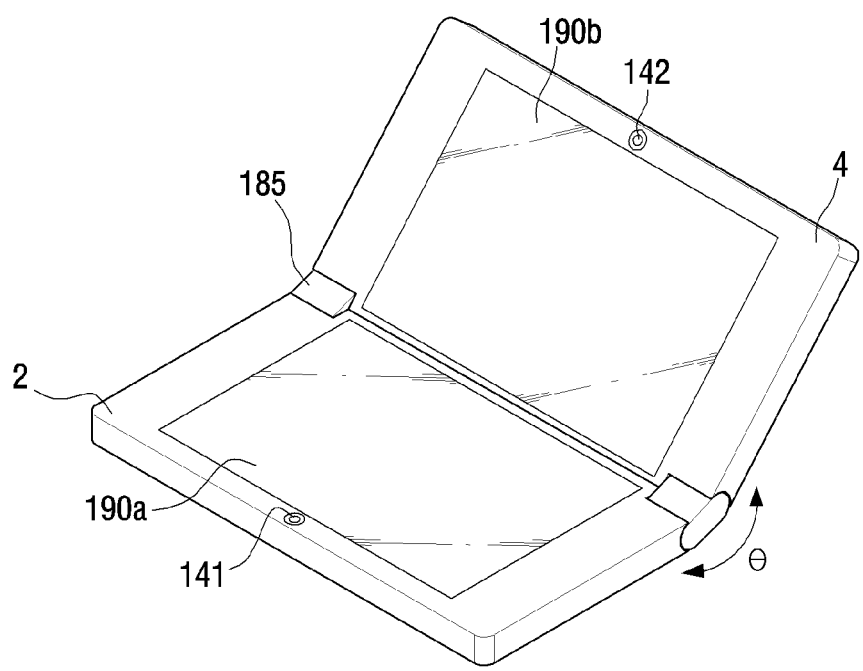

FIGS. 32 to 33 illustrate a screen converting in tool kit mode of the multi-display apparatus 100 according to an exemplary embodiment.

FIG. 32 illustrates a configuration in which relative angle θ is more than 180°, i.e., the two displays 190a, 190b are folded inside by a little. In this specification, such a configuration is referred to as tool kit mode. For example, the multi-display apparatus 100 recognizes the tool kit mode when relative angle θ between the first and second bodies 2, 4 is 185° to 265°. The tool kit mode may be used helpfully when the multi-display apparatus 100 is used as a similar format with a notebook. For example, various task environments may be provided; a job screen may be displayed on one display 190*a* while tools such as keyboard or touchpad are displayed on the other display 190*b*.

FIG. 33 illustrates an embodiment of screen converting in the tool kit mode.

Referring to FIG. 33(1), the first display 190*a* displays a plurality of thumbnail images 45. The second display 190*b* shows one image 42*a* selected from the plurality of thumbnail images 45 displayed on the first display 190*a* as whole screen. Generally, photographs may be horizontally or vertically oriented according to focus objects or photographing angles. An image photographed horizontally may be displayed lengthwise as a forward directed image in the multi-display apparatus 100. However, an image photographed vertically may appear as an image rotated left or right in the multi-display apparatus 100, therefore a user may be inconvenienced when attempting to confirm or edit the photographed image.

In FIG. 33(1), a user selects vertically photographed image 41 among the plurality of thumbnail images 45 displayed on the first display 190*a* and operates the selected image as whole image 42*a* on the second display 190*b*. Because the image 42*a* displayed on the second display 190*b* appears rotated by 90° counterclockwise, a user performs movements of the screen converting gestures 34*a* which convert the image by 90° clockwise.

Referring to FIG. 33(2), the controller 130 rotates image 42*b* displayed on the second display 190*b* by 90° clockwise in response to a screen converting command of the user.

Figure 34:
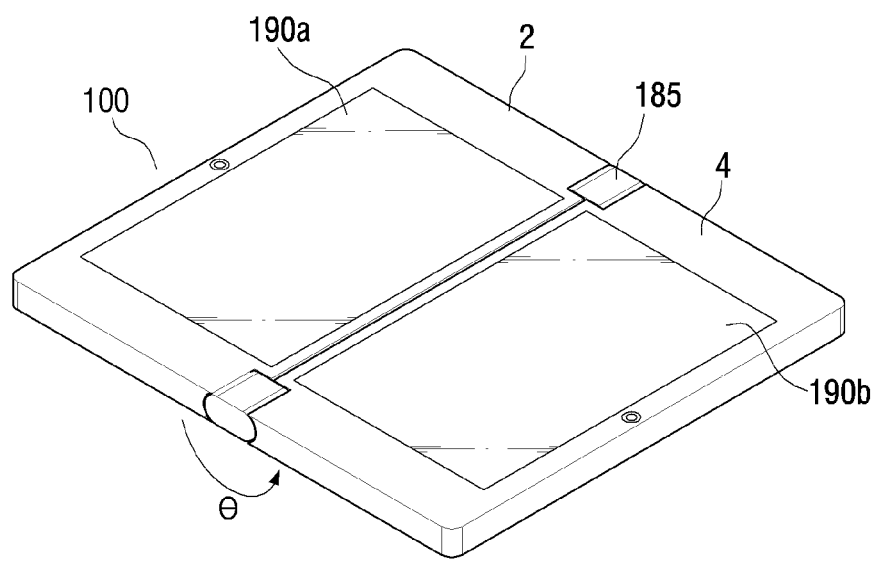

FIGS. 34 to 35 illustrate screen converting in expanding mode of the multi-display apparatus 100 according to an exemplary embodiment.

FIG. 34 illustrates a configuration in which the first body 2 and the second body 4 are spread in parallel, and relative angle θ is 180° or comes to 180° within certain range, i.e., unfolded. This configuration is referred to as expanding mode. For example, when relative angle θ between the first and second bodies 2, 4 is within 175° to 185°, the multi-display apparatus 100 may consider that the first and second bodies 2, 4 are unfolded. The expanding mode may provide various view modes such as displaying two job screens regarding two applications on the two displays 190*a*, 190*b*, displaying two job screens regarding one application on the two displays 190*a*, 190*b*, or displaying widely one job screen regarding one application on the two displays 190*a*, 190*b*. When an application only requires the use of one of the displays 190*a*, 190*b*, the unused display may be turned off or show, for example, a home screen. The expanding mode may be used helpfully in E-books and video player applications.

FIG. 35 illustrates an exemplary embodiment of screen converting in the expanding mode.

Referring to FIG. 35(1), the first user 7 and the second user 8 are facing each other with the multi-display apparatus 100 positioned between them. The first and second displays 190*a*, 190*b* display forward directed screens from a view point of the first user 7. The second user 8 performs movements of screen converting gestures 31*c* on the second display 190*b*. FIG. 35(1) illustrates performing the screen converting gestures 31*c* so that a command is issued to display the screen on the second display 190*b* in a forward directed screen from a view point of the second user 8. However, this is only exemplary, as a screen may be converted in a direction of any one side among the four sides of the second display 190*b*. The controller 130 may display a moderated screen to be suitable for resolution when the screen is rotated by 90° and displayed.

Referring to FIG. 35(2), the screen of the second display 190*b* is rotated by 180° and displayed in response to a screen converting command of the second user 8. The screens displayed on the first and second displays 190*a*, 190*b* may be the same screen or screens including different instances of the same application or otherwise related with each other.

For example, when the multi-display apparatus 100 is used in a learning environment, the first user 7 may be a teacher and the second user 8 may be a student. Therefore, the same learning contents may be displayed on the first and second displays 190*a*, 190*b*. Further, when contents for teachers and contents for students regarding the same topic are displayed, the first display 190*a* may display contents for teachers and the second display 190*b* may display contents for students. When it is used in a presentation, the first user 7 may be a service provider and the second user 8 may be a client. In this case, the first and second displays 190*a*, 190*b* may display contracts, presentation materials, and examination materials, and the first user 7 may explain relevant facts to the second user 8.

Various embodiments are explained above; however, implementation is not limited to herein.

Figure 36:
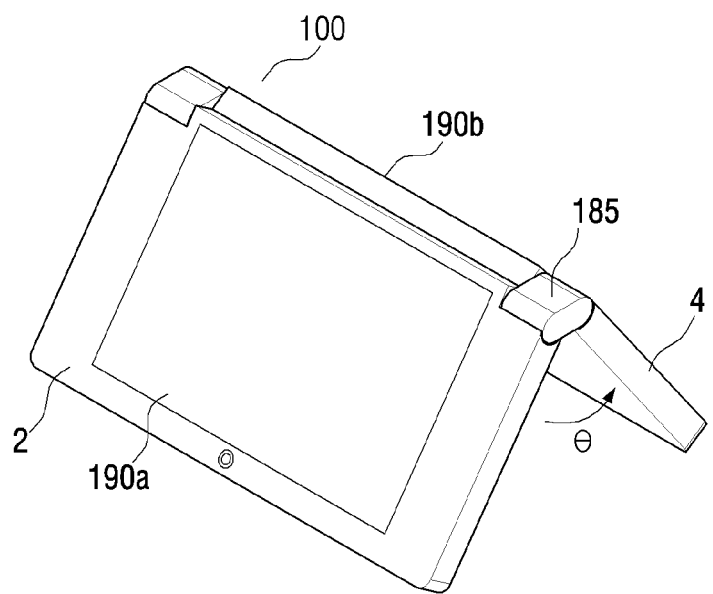
FIG. 36 illustrates a standing mode of a multi-display apparatus.

FIG. 36 illustrates a standing mode of the multi-display apparatus 100.

In FIG. 36, the relative angle θ between the first body 2 and the second body 4 is less than 180°, i.e., the two displays 190*a*, 190*b* are almost folded outside to face almost contrary directions. In this specification, this configuration is referred to as standing mode. For example, when relative angle θ between the first and second bodies 2, 4 is 30° to 90°, the multi-display apparatus 100 recognizes the standing mode. In standing mode, the two displays 190*a*, 190*b* are folded so as to face outside, and the multi-display apparatus 100 can stand in a triangular shape. In this configuration the multi-display apparatus 100 may be used, for example, as a digital clock or picture frame, or used valuably to view personal broadcasting, movie, or video.

As another example, the standing mode may be applied to applications which need collaboration or interworking of more than two users, e.g., video conference or collaborative game. Some applications may display a job screen only on the first display 190*a* at the front in the standing mode, and turn off the second display 190*b* to the rear. Other applications may turn on the second display 190*b* to the rear by using option menu.

Specific embodiments of the standing mode may otherwise be implemented similarly to those of the expanding mode.

Figure 37:
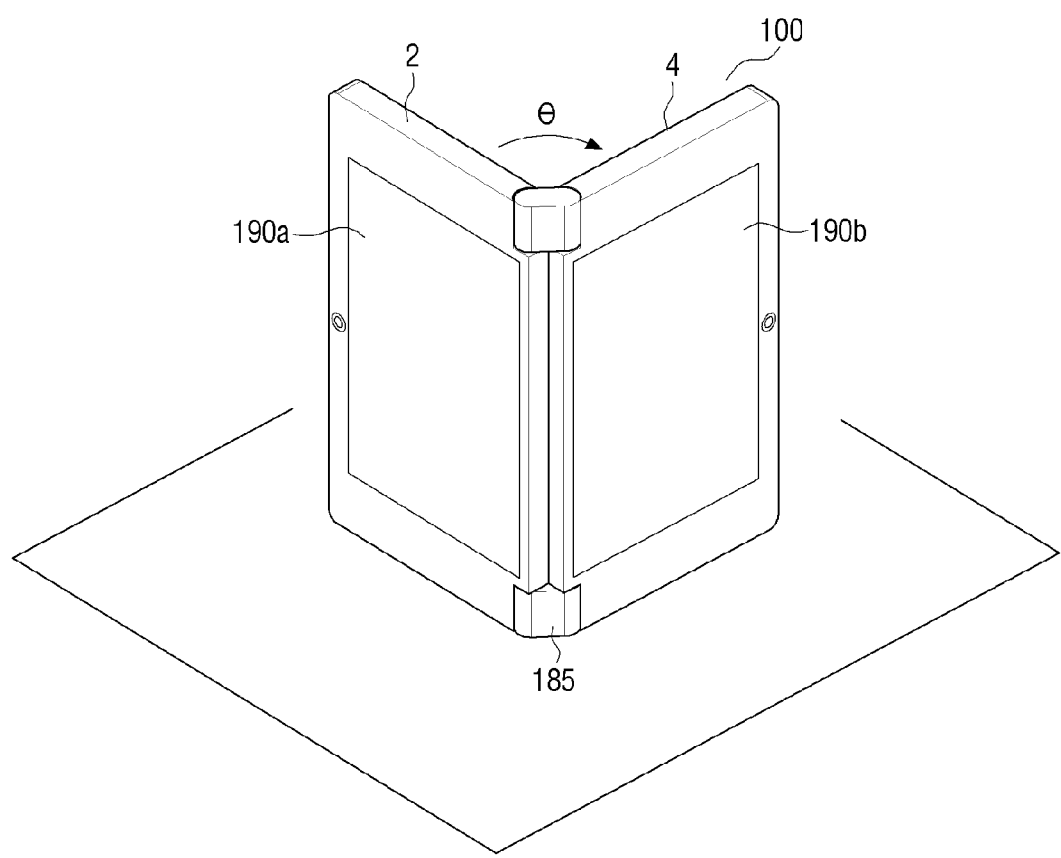
FIG. 37 illustrates another standing mode of a multi-display apparatus.

FIG. 37 illustrates another type of standing mode of the multi-display apparatus 100.

In FIG. 37, the multi-display apparatus 100 stands on the floor so that a part of the hinge 185 contacts to the floor. This configuration is referred to as vertical viewing mode. The vertical viewing mode is recognized when relative angle θ between the first and second bodies 2, 4 is 30° to 60° and the acceleration sensor (not illustrated) recognizes that the multi-display apparatus 100 stands vertically.

Specifically, the acceleration sensor recognizes rotating of the multi-display apparatus 100. The acceleration sensor senses converting between the vertical viewing mode, in which the first and second displays 190*a*, 190*b* of the multi-display apparatus 100 are arranged left and right, and standing mode, in which the first and second displays 190*a*, 190*b* are arranged up and down.

The vertical viewing mode may be applied, for example, to applications which need to provide different images to more than two users respectively, e.g., video conference or multi video player.

As described above, the multi-display apparatus 100 may support various screen modes according to a relative angle θ of the hinge 185. In the following, exemplary constitutions to implement various embodiments will be described.

Figure 38:
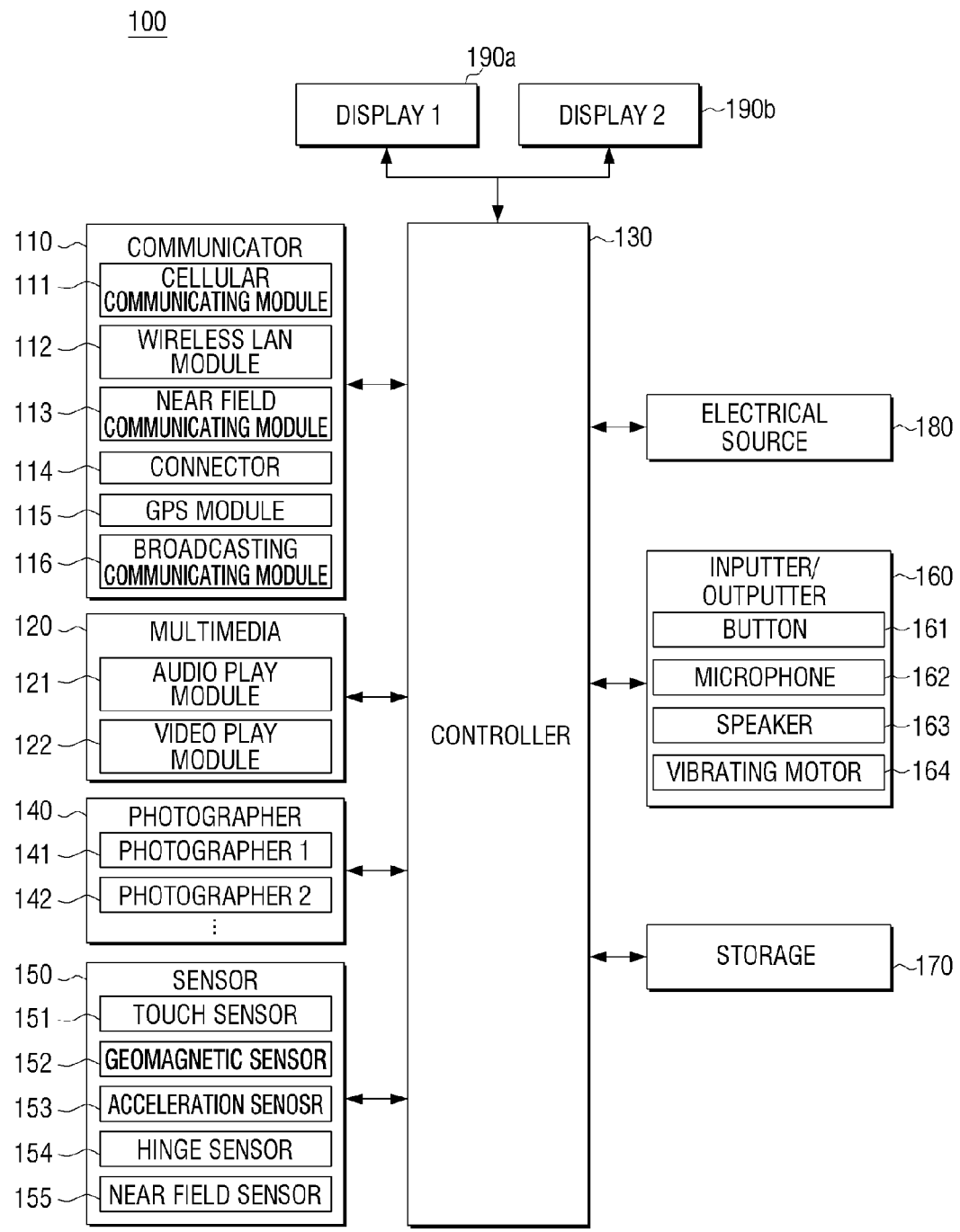
FIG. 38 is a block diagram illustrating a multi-display apparatus according to an exemplary embodiment of the present general inventive concept.

Referring to FIG. 38, multi-display apparatus 100 may connect to external devices (not illustrated) by using, for example, at least one of cellular communicating module 111, wireless LAN module 112, near field communicating module 113 and connector 114 in a communicator unit 110.

External devices may include at least one of the other devices such as cellular phone, smart phone, tablet PC, computer server and digital TV.

The multi-display apparatus 100 includes the two displays 190*a*, 190*b*. Although FIG. 38 illustrates two displays, it may be expanded with three or more displays and implemented moderately.

The multi-display apparatus 100 includes a communicator unit 110, a multimedia unit 120, a controller 130, a photographer unit 140, a sensor unit 150, an inputter/outputter unit 160, a storage 170, an electrical source 180, a first display 190*a* and a second display 190*b*.

The communicator unit 110 includes the cellular communicating module 111, the wireless LAN module 112, the near field communicating module 113, the connector 114, global positioning system (GPS) module 115 and broadcasting communicating module 116.

The cellular communicating module 111 may operate the multi-display apparatus 100 to connect to external devices (e.g., station of the cellular system) through at least one or a plurality of antennas (not illustrated) by using wireless access technology according to a cellular communication protocol.

Further, the cellular communicating module 111 may trans-receive wireless signals for use including a voice call, video call, short message service (SMS) messages, or multimedia messaging service (MMS) message communication with other devices, such as a cellular phone, smart phone, tablet PC or others.

Further, the communicator 110 may include at least one of the wireless LAN module 112 and the near field communicating module 113. For example, it may include the wireless LAN module 112 only, the near field communicating module 113 only, or both of the wireless LAN module 112 and the near field communicating module 113.

The wireless LAN module 112 may connect to the Internet in a place where a wireless AP (not illustrated) is available according to controlling of the controller 130. The wireless LAN module 112 may support, for example, wireless LAN standard IEEE802.11x by the Institute of Electrical and Electronics Engineers.

The near field communicating module 113 may perform near field communication wirelessly between the multi-display apparatus 100 and external devices according to controlling of the controller 130. Near field communication methods may include Bluetooth and infrared data association (IrDA).

The connector 114 may provide interface with various devices under communication standards such as, for example, USB 2.0, USB 3.0, HDMI and IEEE 1394.

The connector 114 may be used as interface to connect the multi-display apparatus 100 with external devices or electrical sources. Through wire cables connected to the connector 114, data stored in the storage 170 of the multi-display apparatus 100 may be transmitted to external devices or data may be received from external devices according to controlling of the controller 130. Through wire cables connected to the connector 114, electrical power may be provided from an electrical source, or a battery (e.g., electrical source 180) powering the multi-display apparatus 100 may be charged.

The GPS module 115 may receive electrical waves from a plurality of GPS satellites (not illustrated) operating on the orbits of the Earth, and calculate time of arrival from the GPS satellites (not illustrated) to the multi-display apparatus 100 and position of the multi-display apparatus 100 by using GPS parameters.

The broadcasting communicating module 116 may receive broadcasting signals, e.g., TV broadcasting signals, radio broadcasting signals or data broadcasting signals, and broadcasting additional information, e.g., electric program guide (EPS) or electric service guide (ESG) which are transmitted from broadcasting stations through broadcasting antennas (not illustrated) according to controlling of the controller 130.

The multimedia unit 120 includes audio playing module 121 and video playing module 122.

The audio playing module 121 may play digital audio files, e.g., files whose filename extension is mp3, wma, ogg or wav, or other file types which are stored or received according to controlling of the controller 130. The video playing module 122 may support various formats of codec so as to play digital video files. In other words, a video file may be played using a prestored codec suitable for a format of the video file to be played. Further, the audio playing module 121 or the video playing module 122 of the multimedia unit 120 may be included in the controller 130.

The controller 130 includes read-only memory (ROM) which stores control programs to control the multi-display apparatus 100 and random access memory (RAM) which recalls signals or data inputted from outside of the multi-display apparatus 100 or is used as recall area for jobs performing in the multi-display apparatus 100. CPU may include, for example, at least one of single core processor, dual core processor, triple core processor and quad core processor. CPU, ROM and RAM may be connected to each other through an internal bus.

The controller 130 controls the communicator unit 110, the GSP module 115, the multimedia unit 120, the photographer unit 140, the sensor unit 150, the inputter/outputter unit 160, the storage 170, the electrical source 180, and the first and second displays 190*a*, 190*b*.

The photographer unit 140 includes at least one of the first photographer 141 and the second photographer 142. Although FIG. 38 illustrates the first photographer 141 and the second photographer 142, additional photographers may be included according to embodiments.

The first photographer 141 and the second photographer 142 may be mounted on the body of the multi-display apparatus 100 or connected to the multi-display apparatus 100 by using other connecting methods. At least one the first photographer 141 and the second photographer 142 may include a supportive light source, e.g., flash (not illustrated), which provides lights to aid in photographing.

According to an embodiment, the first photographer 141 may be formed on the front of the multi-display apparatus 100 and the second photographer 142 may be formed at the rear of the multi-display apparatus 100. According to another embodiment, the first photographer 141 and the second photographer 142 may be arranged adjacently, e.g., interval between the first photographer 141 and the second photographer 142 is more than 1 cm and less than 8 cm, and they may photograph 3D still image or 3D video. Further, the first photographer 141 may be arranged on the first body and the second photographer 142 may be arranged on the second body.

The photographer 141, 142 includes a lens and an image sensor. The types of lenses that can be used in the photographer 141, 142 may include a normal widely used lens, a pantoscope lens, and/or a zoom lens. The first and second photographers 141, 142 may include identical lens types; however, the photographers 141, 142 may include different respective lens types in alternate embodiments.

The image sensors may be complementary metal oxide semiconductor (CMOS) and charge coupled device (CCD). The first and second photographers 141, 142 are generally constructed with one type of the image sensors; however, they may be constructed by combining different types of the image sensors. For example, both of the first and second photographers 141, 142 may use CMOS or CCD, or, the first photographer 141 may use CMOS while the second photographer 142 may use CCD.

The photographer unit 140 may deliver a photographed image to the controller 130 through at least one of the first photographer 141 and the second photographer 142. The controller 130 may detect user movements or user shapes by analyzing the image, and may perform commands corresponding to the detected movements. For example, movements of user hands may be detected through the first photographer 141 or the second photographer 142. User shapes may indicate user face shapes detected through the first photographer 141 or the second photographer 142.

For another example, the multi-display apparatus 100 may detect user movements by using other methods such as an infrared detector, and implement or control applications in response to the movements.

The sensor unit 150 includes the touch sensor 151, the geomagnetic sensor 152, the acceleration sensor 153, the hinge sensor 154, and the near field sensor 155.

The touch sensor 151 may sense user touches regarding the display. The touch sensor 151 may be classified into any of an electrostatic method or a piezoelectric method according to methods used to sense user touches. The touch sensor 151 according to an embodiment may be implemented in each of the two methods. The touch sensor 151 may be constituted with the display panel in the display. Further explanations will be described below.

The touch sensor 151 may detect user input on the display screen via a user pushing the displays 190a, 190b with a part of human body, such as a finger, or other inputting means that can be sensed. The touch sensor 151 may detect user input via, for example changes in charging capacity, resistance quantity, or light quantity.

The geomagnetic sensor 152 may sense an azimuth by examining geomagnetics. Thus, a direction of the multi-display apparatus 100 may be recognized. The acceleration sensor 153 may calculate dynamic measurements such as acceleration, vibration, or pulse of objects by processing output signals and sensing velocity changes or power intensity. The hinge sensor 154 may sense angle changes or movements of the hinge. The near field sensor 155 may sense whether an object approaches the multi-display apparatus 100.

Although not illustrated in FIG. 38, the sensor unit 150 of the multi-display apparatus 100 may include at least one of a gravity sensor which senses a direction influenced by gravity, a gyro sensor which senses six axes by putting rotating to the previous acceleration sensor respectively, an orientation sensor which automatically rotates or arranges contents by automatically sensing horizontal and vertical frames of the contents, such as image, an illuminating sensor which senses light quantity around the multi-display apparatus 100, a height measuring sensor which measures air pressure, an RGB sensor which examines object colors, a distance measuring sensor which measures distance by using ultrasonic waves or infrared lights, and a hall sensor which uses changes in pressure according to intensity of a magnetic field.

Each sensor of the sensor unit 150 may sense a situation, generate signals corresponding to the sensed situation, and transmit data regarding the sensed situation to the controller 130. The sensors of the sensor unit 150 may be added or deleted according to functions of the multi-display apparatus 100.

The inputter/outputter unit 160 includes a button 161, a microphone 162, a speaker 163 and a vibrating motor 164.

At least one button 161 may be formed in push type or touch type on the front, side, or back of the body of the multi-display apparatus 100, and include at least one of, for example, a power/lock button, a volume button, a menu button, a home button, a back button and a search button.

The microphone 162 generates electrical signals by receiving voices or sounds according to controlling of the controller 130.

The speaker 163 may output sounds corresponding to various signals of the cellular communicating module 111, the wireless LAN module 112, the near field communicating module 113, the multimedia unit 120 or the photographer unit 140, e.g., wireless signals, broadcasting signals, digital audio files, digital video files, or files from the photographer unit 140, to the outside of the multi-display apparatus 100.

The speaker 163 may also output sounds corresponding to functions which the multi-display apparatus 100 performs, e.g., button sounds corresponding to calling or connecting sounds. The speaker 163 may be formed on a proper position or proper positions of the multi-display apparatus 100, singularly or plurally. For example, the speaker 163 may be constituted by including an internal speaker module which is arranged on a proper position to approach to an ear of a user while calling, and an external speaker module which has higher output to be proper for playing audio/video files or watching broadcastings, and which is arranged on a proper position of the body in the multi-display apparatus 100.

The vibrating motor 164 may convert electrical signals into mechanical vibrations according to controlling of the controller 130. For example, when a voice call is received from another device (not illustrated), the multi-display apparatus 100 in vibrating mode operates the vibrating motor 164. The vibrating motor 164 may be formed within the body of the multi-display apparatus 100 singularly or plurally. The vibrating motor 164 may operate in response to touch gestures of a user sensed on the first and second displays 190a, 190b and consecutive movements of touches sensed on the first and second displays 190a, 190b.

The storage 170 stores various types of multimedia data processed by the controller 130, contents data, and received data from external sources.

The storage 170 may store data regarding inputting/outputting signals, e.g., information or data in response to operations of the cellular communicating module 111, the wireless LAN module 112, the near field communicating module 113, the connector 114, the GPS module 115, the multimedia unit 120, the photographer unit 140, the sensor unit 150, the inputter/outputter unit 160, the first display 190a and the second display 190b.

The storage 170 may store controlling programs and applications to control the multi-display apparatus 100 or the controller 130. The term "storage" as used herein may include ROM, RAM, or memory card that can attach/detach to the multi-display apparatus 100 (e.g., SD card or memory stick). Further, the storage may include non-volatile memory, volatile memory, hard disc drive (HDD) or solid state drive (SSD).

The electrical source 180 provides electrical power used in the multi-display apparatus 100. The electrical source 180 may be batteries that can be charged, and may further include a voltage converter which converts and provides power from an external electrical source to the batteries that can be charged.

The electrical source 180 may operate in various modes such as maximum mode, normal mode, saving mode, and standby mode according to controlling electrical source management of the controller 130.

The first and second displays 190a, 190b may be connected to each other by the hinge (not illustrated). The first and second displays 190a, 190b display applications, multimedia contents, image, video, and text and other screens by controlling of the controller 130.

The first display 190a and the second display 190b are physically separated. Display screens displayed on the first display 190a and the second display 190b may be controlled independently. For example, resolution of the first display 190a and resolution of the second display 190b may be established separately. Further, expansion, rotation, movement and division of the screens displayed on the first display 190a and the second display 190b may be performed separately.

Further, the first display 190a and the second display 190b may display a united display screen by using a virtual united frame buffer.

The first and second displays 190a, 190b may be implemented in any of various technologies, such as, for example, liquid crystal display panel (LCD panel), plasma display panel (PDP), organic light emitting diode (OLED), vacuum fluorescent display (VFD), field emission display (FED), and electro luminescence display (ELD).

The first and second displays 190a, 190b may be implemented as display panels without having a touch inputting capacity, or as touch display panels which can recognize user manipulation by using the near field sensor 155 or the touch sensor 151. When implemented as touch display panels, at least one of touch gestures may be inputted through a part of a user body (e.g., fingers including a thumb) or sensible inputting means (e.g., a stylus).

Such user interface may include designated touch areas, a soft key and a soft menu. The first and second displays 190a, 190b may transmit electrical signals corresponding to at least one of touch gestures inputted through the user interface to the first and second displays 190a, 190b through a LCD controller (not illustrated). Further, the first and second displays 190a, 190b may sense consecutive movements of touches and transmit electrical signals corresponding to linear or nonlinear movements to the LCD controller.

For example, the first and second displays 190a, 190b may be implemented with a resistive method, a capacitive method, an infrared method, or an acoustic wave method.

The first and second displays 190a, 190b convert the sensed signals of user movements by the touch sensor 151 to digital signals (e.g., X and Y coordinates) and transmit the digital signals to the controller 130. The controller 130 may perform commands and various controlling operations corresponding to the inputted user movements through the first and second displays 190a, 190b by using the received digital signals. For example, responding to the user movements, the controller may operate so that the soft key displayed on the first and second displays 190a, 190b can be selected or applications corresponding to the soft key can be executed.

The above user gestures also include non-contact means and are not limited to direct contacting with the first and second displays 190a, 190b by a user or to inputting means that can be touched. A degree of user movements that can be examined by the first and second displays 190a, 190b may be moderated according to performance or structure of the multi-display apparatus 100.

The above embodiments illustrate and describe bodies of the multi-display apparatus 100 as connected by a hinge; however, they may be connected by a connector comprising flexible material instead of a hinge.

FIG. 39 illustrates constitution of the multi-display apparatus 100 according to various implementing embodiments.

Referring to FIG. 39, the multi-display apparatus 100 includes the communicator unit 110, the multimedia unit 120, the controller 130, ROM 137, the photographer unit 140, the sensor unit 150, the inputter/outputter unit 160, the storage 170, the electrical source 180, and a multi-display 190. The same units described in FIG. 38 will not be further described, and a display process will be explained below.

CPU 131 reads data stored in the storage 170 to RAM 135 and delivers data that needs to be graphic-processed among the data stored in RAM 135. CPU 131 receives the graphic-processed data by GPU 133, transmits the data to the LCD controller (not illustrated) connected with system bus 139, and displays an image on the multi-display 190.

CPU 131 temporarily stores image data processed by GPU 133 in a virtual frame buffer area allocated on a predetermined area of RAM 135. CPU 131 allocates virtual frame buffer area so that a maximum resolution (e.g., 1024×600) can be supported. When two displays are mounted, the virtual frame buffer area is allocated with maximum size.

CPU 131 inputs temporarily-stored data on the virtual frame buffer to GPU 133 and performs digital signal processing.

GPU 133 performs graphic processing regarding the inputted data under the control of CPU 131. Specifically, GPU 133 may generate screens including various objects such as icons, images or text by using a calculator (not illustrated) and a renderer (not illustrated). The calculator calculates feature values, such as coordinates to display each object, shape, size, or color according to screen layout. The renderer generates screens in various layouts, including objects based on the calculated feature values. The screens generated in the renderer may be delivered to the first and second displays 190a, 190b through the bus 139, and displayed or stored in the storage 170.

CPU 131 may control displaying the graphic-processed data by GPU 133 on at least one of the first and second displays 190a, 190b, or control storing the data in the storage 170, or input the processed data into a display controller (not illustrated).

GPU 133 may include a decoder, a renderer, and a scaler. Accordingly, stored contents are decoded, frames are constituted by rendering the decoded contents, and a size of the constituted frame is scaled according to display size by controlling of the display controller (not illustrated). When a screen is displayed on any one of the first and second displays 190a, 190b, the screen may be scaled according to the screen size. When a screen is displayed on both of the two displays, the screen may be scaled according to combined size of the two displays. GPU 133 provides and displays the processed frame on the display.

Because the multi-display apparatus 100 includes a plurality of displays, it may provide various screens by using the displays. In the following, basic detailed constitution and operations of the multi-display apparatus 100 will be described.

Figure 40:
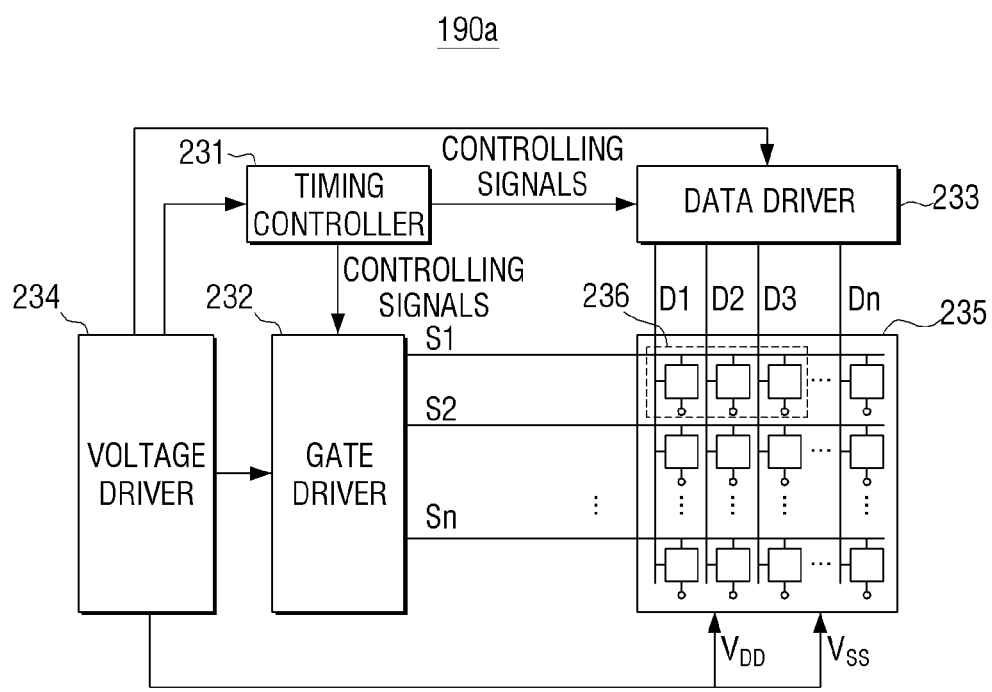
FIG. 40 is a diagram illustrating constitution of one display according to an exemplary embodiment of the present general inventive concept.

FIG. 40 illustrates constitution of one display according to an exemplary embodiment.

For convenient explanation, FIG. 40 illustrates the first display; however, the second, third or any other display may be implemented in the same constitution.

Referring to FIG. 40, the first display 190a may include a timing controller 231, a gate driver 232, a data driver 233, a voltage driver 234, and a display panel 235.

The timing controller 231 generates gate controlling signals (passing controlling signals) and data controlling signals (data signals) by externally receiving clock signals (DCLK), horizontal synchronizing signals (Hsync) and vertical synchronizing signals (Vsync) that are appropriate for resolution of the touch screen, rearranges inputted RGB data and provides data to the data driver 233.

The timing controller 231 may generate gate shift clock (GSC), gate output enable (GOE) and gate start pulse (GSP) signals regarding the gate controlling signals. GSC signals are signals which determine on/off time of a thin film transistor (TFT) connected to a light-emitting diode such as an R, G, B organic light emitting diode (OLED). GOE signals are signals which control output of the gate driver 232. GSP are signals which inform a first driving line of the screen from one Vsync.

Further, the timing controller 231 may generate source sampling clock (SSC), source output enable (SOE) and source start pulse (SSP) signals regarding the data controlling signals. SSC signals are used as a sampling clock to latch data in the data driver 233 and determine driving frequency of a data drive IC. SOE signals deliver the latched data by the SSC to the display panel 235. SSP signals are signals which inform a starting of latching or sampling data during a period of horizontal synchronizing.

The gate driver 232 is a unit which generates passing signals, and is connected to the display panel 235 through passing lines S1, S2, S3, ..., Sn. The gate driver 232 approves gate on/off voltage (Vgh/Vgl) provided from the voltage driver 234 to the display panel 235 according to the gate controlling signals generated by the timing controller 231. Gate on voltage (Vgh) is consecutively provided from gate line 1 (not illustrated) to gate line N (not illustrated) to implement a basic frame image on the display panel 235.

The data driver 233 generates data signals, and is connected to the display panel 235 through data lines D1, D2, D3, ..., Dn. The data driver 233 completes scaling according to the data controlling signals generated in the timing controller 231 and inputs RGB data of the image frame to the display panel 235. The data driver 233 converts the RGB image data provided in serial from the timing controller 231 to be in parallel, converts digital data to analogue voltage, and provides image data corresponding to one horizontal line to the display panel 235. This process is implemented consecutively in each horizontal line.

The voltage driver 234 generates and delivers driving voltage to the gate driver 232, the data driver 233, and the display panel 235 respectively. In other words, the voltage driver 234 generates and provides electrical power voltage (VDD) necessary for the display panel 235 or provides grounded voltage (VSS) by receiving commonly used external electrical power, i.e., alternate voltage of 110 V or 220 V. Further, it may generate and provide gate on voltage (Vgh) to the gate driver 232. The voltage driver 234 may include a plurality of voltage driving modules (not illustrated) which operate separately for the above process. The plurality of voltage driving modules (not illustrated) may operate to provide different voltages according to controlling of the controller 130. The controller 130 may control the voltage driver 234 so that the plurality of voltage driving modules provide different driving voltages according to preset information. For example, each of the plural voltage driving modules may provide different first voltage and defaulted second voltage by controlling of the controller 130 according to preset information.

According to an embodiment, the voltage driver 234 may include the plurality of voltage driving module corresponding to each area of the display panel 235 which is divided into a plurality of areas. In this case, the controller 130 may control the plurality of voltage driving module to provide the different first voltage, i.e., ELVDD voltage according to screen information (or inputted image information) in each of the plural areas. Thus, the controller 130 may control amount of ELVDD voltage by using image information inputted to the data driver 233. The screen information may be at least one of brightness information and grey scale information regarding the inputted image.

The display panel 235 forms the plurality of gate lines GL1~GLn (not illustrated) and data lines D1~Dn to be crossed with each other and define pixel areas, and RGB emitting diode such as OLED may be formed on crossed pixel area 236. A switching diode, i.e., a TFT, may be formed on one area of the pixel area 236, for example, on the corner. While the TFT is turned on, grey scale voltage from the data driver 233 is provided to R, G, B emitting diodes, respectively. At this step, R, G, B emitting diodes provide light in response to the amount of the provided electrical current based on the grey scale voltage. As more electrical current is provided, the R, G, B emitting diodes provide more light.

Figure 41:
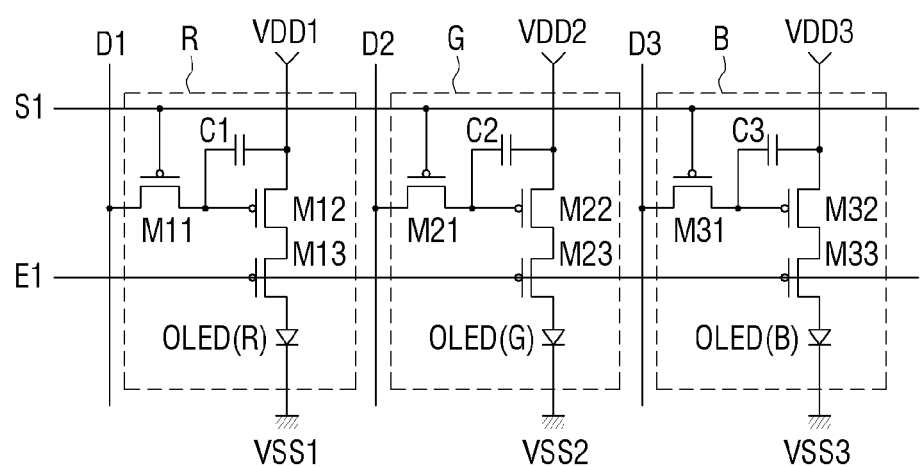
FIG. 41 is a view illustrating circuit structure constituting R, G, B pixels which the display panel illustrated in FIG. 40 forms.

FIG. 41 illustrates circuit structure constituting R, G, B pixels formed in the display panel illustrated in FIG. 40.

Referring to FIG. 41, the display panel 235 from FIG. 40 includes R, G, B pixel areas 236. The R, G, B pixel area 236 may include scan signals (S1), switching diodes (M11, M21, M31) which operate by gate on voltage (Vgh), switching diodes (M12, M22, M32) which output electrical current based on pixel values including moderated grey scale values provided through the data lines D1~Dn, and switching diodes (M13, M23, M33) which adjust electrical current provided to the R, G, B emitting diode from the switching diodes (M12, M22, M32) according to controlling signals provided from the timing controller 231. Further, the switching diodes (M13, M23, M33) provide electrical current to OLED by connecting the OLED to electrical current from switching diodes (M12, M22, M32). The OLED indicates a display which emits lights in itself by the light emitting principle of the electromagnetic field when electrical current flows to fluorescent or phosphorescent organic thin films.

Anode electrodes of the OLED connect to pixel circuits and cathode electrodes connect to VSS. Each OLED generates light having a certain brightness in response to electrical currents provided from the respective pixel circuits. Gate electrodes of the switching diodes (M11, M21, M31) connect to a passing line S1 and any one of source electrodes and drain electrodes connects to a data line (D1, D2, D3). A capacitor (C1, C2, C3) may be connected between voltage (VDD1, VDD2, VDD3) and the source/drain of the switching diodes (M11, M21, M31) connected to the gate of switching diode (M12, M22, M32). The display panel 235 may be implemented as active matrix OLED panel (AMOLED panel).

The above embodiment is one of the exemplary embodiments, and the general inventive concept does not exclude, for example, passive matrix OLED (PMOLED) in which one line simultaneously emits and operates.

Figure 42:
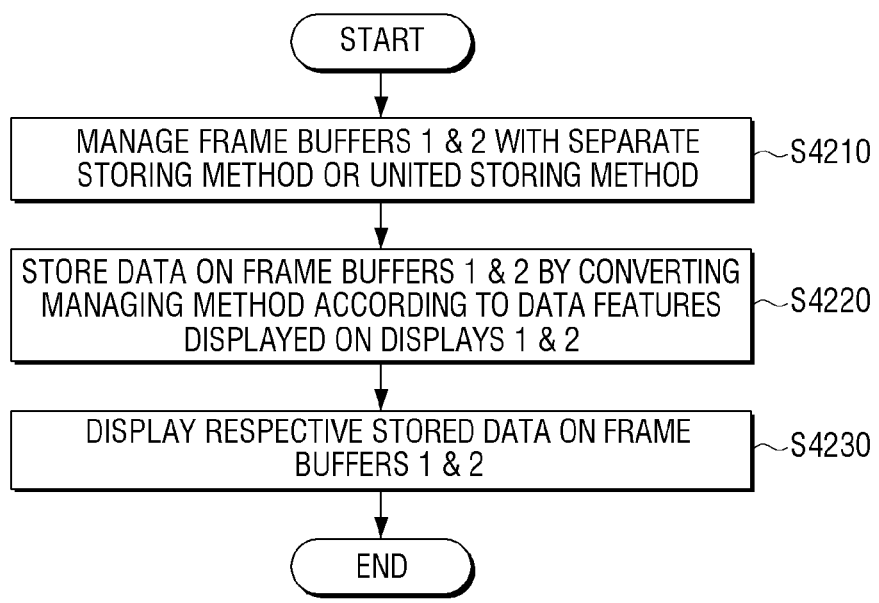
FIG. 42 is a flowchart illustrating a controlling method regarding a multi-display apparatus according to an exemplary embodiment of the present general inventive concept.

FIG. 42 is a flowchart illustrating a controlling method in the multi-display apparatus 100 according to an embodiment.

Referring to FIG. 42, the multi-display apparatus 100 manages the first and second frame buffers with a separate storing method or a united storing method at operation S4210. The separate storing method indicates a method which controls display screens by recognizing the first frame buffer and the second frame buffer as separate frame buffers. The united storing method indicates a method which controls display screens by recognizing the first frame buffer and the second frame buffer as a united frame buffer.

The multi-display apparatus 100 stores data in the first and second frame buffers by converting a managing method according to data features displayed on the first and second displays at operation S4220. The multi-display apparatus 100 uses the separate storing method when the first and second displays are determined to display separate screens, and uses the united storing method when the first and second displays are determined to display one screen.

The first and second displays display the data stored in the first and second frame buffers at operation S4230.

According to the above various embodiments, the multi-display apparatus 100 examines rotation information when a screen rotating event occurs. The multi-display apparatus 100 stores the screen data converted by using the examined rotation information on corresponding frame buffer, and outputs the data to the display.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains For example, a non-transitory computer readable medium may store programs which implement the following steps: managing the first and second frame buffers with one of the separate storing methods that manages the first and second frame buffers separately to store data, and the united storing method that manages the first and second frame buffers as one virtual united frame buffer to store data, storing data in the first and second frame buffers by converting a managing method according to data features displayed on the first and second displays, and displaying the stored data in the first and second frame buffers.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-display apparatus, comprising:
   a first body which comprises a first display;
   a second body which comprises a second display;
   a hinge which connects the first body and the second body;
   a first frame buffer which corresponds to the first display;
   a second frame buffer which corresponds to the second display; and
   a controller which manages the first frame buffer and the second frame buffer according to a managing method to implement one of a separate storing method which separately manages the first frame buffer and the second frame buffer and stores data, and a united storing method which manages the first frame buffer and the second frame buffer as one virtual united frame buffer and stores data,
   wherein the controller allocates addresses on the first frame buffer and the second frame buffer according to the managing method, stores data in the first frame buffer and the second frame buffer by converting the managing method according to data features displayed on the first display and the second display and adjusts the data stored in the first frame and the second frame buffer respectively by using addresses allocated to the first frame buffer and the second frame buffer, and
   the first display and the second display display the adjusted data stored in the first frame buffer and the second frame buffer, respectively.

2. The multi-display apparatus of claim 1, wherein the controller:
   allocates separate addresses on the first frame buffer and the second frame buffer when managing with the separate storing method;
   divides whole addresses of the virtual united frame buffer into a first group and a second group and allocates addresses of the first group on the first frame buffer and addresses of the second group on the second frame buffer when managing with the united storing method; and
   dynamically allocates the addresses.

3. The multi-display apparatus of claim 2, further comprising:
   a rotation recognizing sensor which senses rotation of the multi-display apparatus,
   wherein the controller adjusts a first screen data to be displayed on the first display and a second screen data to be displayed on the second display respectively according to the rotation, stores the adjusted first and second screen data on the first frame buffer and the second frame buffer, and separately converts screens of the first display and the second display according to the rotation.

4. The multi-display apparatus of claim 2, further comprising:
   a user recognizing sensor which recognizes user position,
   wherein the controller adjusts a first screen data to be displayed on the first display and a second screen data to be displayed on the second display respectively according to the user position, stores the adjusted first and second screen data on the first frame buffer and the second frame buffer, and separately converts screens of the first display and the second display according to the recognized user position.

5. The multi-display apparatus of claim 2, further comprising:
   a photographer,
   wherein the controller adjusts a first screen data to be displayed on the first display and a second screen data to be displayed on the second display respectively when user gestures for converting a screen are recognized based on an image captured by the photographer, stores the adjusted first and second screen data on the first frame buffer and the second frame buffer, and separately converts screens of the first display and the second display according to the user gestures.

6. The multi-display apparatus of claim 2, further comprising:
a touch sensor,
wherein the controller adjusts a first screen data to be displayed on the first display and a second screen data to be displayed on the second display respectively when touch gestures for converting a screen are sensed by the touch sensor, stores the adjusted first and second screen data on the first frame buffer and the second frame buffer, and separately converts screens of the first display and the second display according to the touch gestures.

7. The multi-display apparatus of claim 2, wherein, when data stored in the first frame buffer and data stored in the second frame buffer are the same, and when data stored in the first frame buffer is adjusted, the controller adjusts data stored in the second frame buffer to be uniform with data stored in the first frame buffer and stores the adjusted data on the second frame buffer so that screens of the first display and the second display can be simultaneously converted.

8. The multi-display apparatus of claim 1, wherein screens of the first display and the second display are home screens or implement screens of selected applications.

9. A controlling method of a multi-display apparatus which comprises a first body mounted with a first display, a second body mounted with a second display, and a hinge connecting the first body and the second body, the controlling method comprising:
managing a first frame buffer and a second frame buffer according to a managing method to implement one of a separate storing method which separately manages the first frame buffer and the second frame buffer and stores data and a united storing method which manages the first frame buffer and the second frame buffer as one virtual united frame buffer and stores data according to allocated addresses of the first frame buffer and the second frame buffer;
storing data on the first frame buffer and the second frame buffer by converting the managing method according to data features displayed on the first display and the second display;
adjusting the data stored in the first frame buffer and the second frame buffer respectively by using addresses allocated to the first frame buffer and the second frame buffer, and
displaying the adjusted data stored in the first frame buffer and the second frame buffer, respectively.

10. The controlling method of claim 9, wherein the managing the first frame buffer and the second frame buffer further comprises:
allocating separate addresses on the first frame buffer and the second frame buffer when managing with the separate storing method,
dividing whole addresses of the virtual united frame buffer into a first group and a second group and allocating addresses of the first group on the first frame buffer and addresses of the second group on the second frame buffer when managing with the united storing method, and
dynamically allocating the addresses.

11. The controlling method of claim 10, further comprising:
sensing rotation of the multi-display apparatus,
wherein storing data on the first frame buffer and the second frame buffer further comprises separately adjusting at least one of a first screen data to be displayed on the first display and a second screen data to be displayed on the second display in a converting format according to the rotation, and storing the adjusted first and second screen data on the first frame buffer and the second frame buffer.

12. The controlling method of claim 10, further comprising:
recognizing user position,
wherein storing data on the first frame buffer and the second frame buffer further comprises separately adjusting at least one of a first screen data to be displayed on the first display and a second screen data to be displayed on the second display so as to be converted according to the user position, and storing the adjusted first and second screen data on the first frame buffer and the second frame buffer.

13. The controlling method of claim 10, further comprising:
photographing user gestures; and
recognizing user gestures by using the photographed image,
wherein the storing data on the first frame buffer and the second frame buffer further comprises separately adjusting at least one of a first screen data to be displayed on the first display and a second screen data to be displayed on the second display so as to be converted according to the user gestures, and storing the adjusted first and second screen data on the first frame buffer and the second frame buffer.

14. The controlling method of claim 10, further comprising:
receiving touch gestures,
wherein the storing data on the first frame buffer and the second frame buffer further comprises separately adjusting at least one of a first screen data to be displayed on the first display and a second screen data to be displayed on the second display so as to be converted according to the touch gestures, and storing the adjusted first and second screen data on the first frame buffer and the second frame buffer.

15. The controlling method of claim 10, wherein, when data stored in the first frame data and data stored in the second frame data are the same, and when data stored in the first frame buffer is adjusted, the storing data on the first frame buffer and the second frame buffer further comprises adjusting data stored in the second frame buffer to be uniform with the data stored in the first frame buffer so that screens of the first display and the second display can be simultaneously converted, and storing the adjusted data on the second frame buffer.

16. The controlling method of claim 9, wherein a screen of the first display and a screen of the second display are home screens or screens corresponding to areas of selected applications.

17. A multi-display device, comprising:
a plurality of display screens;
a plurality of frame buffers to buffer images to be displayed on the plurality of display screens, each frame buffer being associated with a respective display screen; and
a controller to control operation of the plurality of display screens by one of allocating addresses among the plurality of frame buffers independently when the display screens are individually operated and allocating addresses among the plurality of frame buffers collectively as a unified virtual buffer when the display screens are cooperatively operated, wherein the controller adjusts data stored in the plurality of frame buffers respectively by using addresses allocated to the plurality of frame buffers.

18. The multi-display device of claim 17, further comprising a rotation sensor to sense a rotational change in the multi-display device, wherein the controller adjusts data stored in the plurality of buffers to affect a change in orientation of information displayed on the plurality of display screens based on signals from the rotation sensor.

19. The multi-display device of claim 17, further comprising a near field sensor to sense a user gesture in a space near at least one of the plurality of display screens.

20. The multi-display device of claim 19, wherein the controller adjusts data stored in the plurality of buffers to affect a change in orientation of information displayed on the plurality of display screens based on signals from the near field sensor.

21. The multi-display device of claim 19, wherein the controller executes an application based on signals from the near field sensor.

22. The multi-display device of claim 19, wherein the controller executes a preset command based on signals from the near field sensor.

23. A multi-display device, comprising:
a first body;
a second body pivotably connected to the first body;
a first display and a second display mounted on the first body and the second body, respectively, a first frame buffer and a second frame buffer associated with the first display and the second display, respectively, to buffer images to be displayed on the first display and the second display;
a sensor to sense a relative angle between the first body and the second body; and
a controller to control operation of the first display and the second display by one of allocating addresses among the first frame buffer and the second frame buffer independently when the first display and the second display are individually operated and allocating addresses among the first frame buffer and the second frame buffer collectively when the first display and the second display are cooperatively operated,
wherein the controller adjusts data stored in the first frame buffer and the second frame buffer to affect a change in orientation of information displayed on at least one of the first display and the second display based on signals from the sensor.

24. The multi-display device of claim 23, wherein:
the first display and second display further comprise a plurality of touch sensors, and
the controller adjusts data stored in the first frame buffer and the second frame buffer to affect a change in orientation of information displayed on the first display and the second display based on signals from the plurality of touch sensors.

25. A non-transitory computer-readable medium to contain computer-readable codes as a program to execute the method of claim 9.

* * * * *